(12) United States Patent
Bui et al.

(10) Patent No.: US 11,537,950 B2
(45) Date of Patent: Dec. 27, 2022

(54) UTILIZING A JOINT-LEARNING SELF-DISTILLATION FRAMEWORK FOR IMPROVING TEXT SEQUENTIAL LABELING MACHINE-LEARNING MODELS

(71) Applicant: Adobe Inc., San Jose, CA (US)

(72) Inventors: Trung Bui, San Jose, CA (US); Tuan Manh Lai, San Jose, CA (US); Quan Tran, San Jose, CA (US); Doo Soon Kim, San Jose, CA (US)

(73) Assignee: Adobe Inc., San Jose, CA (US)

( * ) Notice: Subject to any disclaimer, the term of this patent is extended or adjusted under 35 U.S.C. 154(b) by 163 days.

(21) Appl. No.: 17/070,568

(22) Filed: Oct. 14, 2020

(65) Prior Publication Data

US 2022/0114476 A1    Apr. 14, 2022

(51) Int. Cl.
  *G06N 20/00* (2019.01)
  *G06F 16/248* (2019.01)
(52) U.S. Cl.
  CPC .......... *G06N 20/00* (2019.01); *G06F 16/248* (2019.01)
(58) Field of Classification Search
  None
  See application file for complete search history.

(56) References Cited

U.S. PATENT DOCUMENTS

| | | | | |
|---|---|---|---|---|
| 2016/0063993 | A1* | 3/2016 | Dolan | G06F 40/279 704/254 |
| 2018/0197087 | A1* | 7/2018 | Luo | G06F 16/285 |
| 2021/0166797 | A1* | 6/2021 | Neumann | G16H 50/20 |
| 2021/0230981 | A1* | 7/2021 | Gupta | G06F 17/16 |
| 2021/0271810 | A1* | 9/2021 | Nadejde | G06N 3/08 |
| 2021/0303783 | A1* | 9/2021 | Misra | G06F 40/44 |
| 2021/0338387 | A1* | 11/2021 | Inam | G06T 7/0012 |
| 2021/0343400 | A1* | 11/2021 | Inam | G16H 40/67 |

(Continued)

OTHER PUBLICATIONS

Rabah Alzaidy, Cornelia Caragea, and C Lee Giles. 2019. Bi-lstm-crf sequence labeling for keyphrase extraction from scholarly documents. In The world wide web conference, pp. 2551-2557.

(Continued)

*Primary Examiner* — Toan H Vu
(74) *Attorney, Agent, or Firm* — Keller Preece PLLC

(57) ABSTRACT

This disclosure describes one or more implementations of a text sequence labeling system that accurately and efficiently utilize a joint-learning self-distillation approach to improve text sequence labeling machine-learning models. For example, in various implementations, the text sequence labeling system trains a text sequence labeling machine-learning teacher model to generate text sequence labels. The text sequence labeling system then creates and trains a text sequence labeling machine-learning student model utilizing the training and the output of the teacher model. Upon the student model achieving improved results over the teacher model, the text sequence labeling system re-initializes the teacher model with the learned model parameters of the student model and repeats the above joint-learning self-distillation framework. The text sequence labeling system then utilizes a trained text sequence labeling model to generate text sequence labels from input documents.

20 Claims, 12 Drawing Sheets

(56) References Cited

U.S. PATENT DOCUMENTS

2022/0012830 A1* 1/2022 Zernik ............... G06Q 50/18
2022/0050967 A1* 2/2022 Veyseh ............. G06F 40/284

OTHER PUBLICATIONS

Isabelle Augenstein, Mrinal Das, Sebastian Riedel, Lakshmi Vikraman, and Andrew McCallum. 2017. SemEval 2017 task 10: ScienceIE—extracting keyphrases and relations from scientific publications. In Proceedings of the 11th International Workshop on Semantic Evaluation (SemEval-2017), pp. 546-555, Vancouver, Canada, August. Association for Computational Linguistics.

Kamil Bennani-Smires, Claudiu Musat, Andreea Hossmann, Michael Baeriswyl, and Martin Jaggi. 2018. Simple unsupervised keyphrase extraction using sentence embeddings. In Proceedings of the 22nd Conference on Computational Natural Language Learning, pp. 221-229, Brussels, Belgium, October. Association for Computational Linguistics.

Florian Boudin and Emmanuel Morin. 2013. Keyphrase extraction for n-best reranking in multi-sentence compression. In Proceedings of the 2013 Conference of the North American Chapter of the Association for Computational Linguistics: Human Language Technologies, pp. 298-305, Atlanta, Georgia, June. Association for Computational Linguistics.

Florian Boudin. 2018. Unsupervised keyphrase extraction with multipartite graphs. In Proceedings of the 2018 Conference of the North American Chapter of the Association for Computational Linguistics: Human Language Technologies, vol. 2 (Short Papers), pp. 667-672, New Orleans, Louisiana, June. Association for Computational Linguistics.

Adrien Bougouin, Florian Boudin, and Bé atrice Daille. 2013. TopicRank: Graph-based topic fanking for keyphrase extraction. In Proceedings of the Sixth International Joint Conference on Natural Language Processing, pp. 543-551, Nagoya, Japan, October. Asian Federation of Natural Language Processing.

Ricardo Campos, Vitor Mangaravite, Arian Pasquali, Alipio Mario Jorge, Celia Nunes, and Adam Jatowt. 2018. Yake! collection-independent automatic keyword extractor. In European Conference on Information Retrieval, pp. 806-810. Springer.

Cornelia Caragea, Florin Adrian Bulgarov, Andreea Godea, and Sujatha Das Gollapalli. 2014. Citation-enhanced keyphrase extraction from research papers: A supervised approach. In Proceedings of the 2014 Conference on Empirical Methods in Natural Language Processing (EMNLP), pp. 1435-1446, Doha, Qatar, October. Association for Computational Linguistics.

Jacob Devlin, Ming-Wei Chang, Kenton Lee, and Kristina Toutanova. 2019. BERT: Pre-training of deep bidirectional transformers for language understanding. In Proceedings of the 2019 Conference of the North American Chapter of the Association for Computational Linguistics: Human Language Technologies, vol. 1 (Long and Short Papers), pp. 4171-4186, Minneapolis, Minnesota, June. Association for Computational Linguistics.

Ernesto D'Avanzo and Bernado Magnini. 2005. A keyphrase-based approach to summarization: the lake system at duc-2005. In Proceedings of DUC.

Samhaa R El-Beltagy and Ahmed Rafea. 2009. Kp-miner: A keyphrase extraction system for english and arabic documents. Information Systems, 34(1):132-144.

Corina Florescu and Cornelia Caragea. 2017a. A position-biased pagerank algorithm for keyphrase extraction. In AAAI.

Corina Florescu and Cornelia Caragea. 2017b. PositionRank: An unsupervised approach to keyphrase extraction from scholarly documents. In Proceedings of the 55th Annual Meeting of the Association for Computational Linguistics (vol. 1: Long Papers), pp. 1105-1115, Vancouver, Canada, July. Association for Computational Linguistics.

Tommaso Furlanello, Zachary C Lipton, Michael Tschannen, Laurent Itti, and Anima Anandkumar. 2018. Born again neural networks. arXiv preprint arXiv:1805.04770.

Sujatha Das Gollapalli, Xiao-Li Li, and Peng Yang. 2017. Incorporating expert knowledge into keyphrase extraction. In Thirty-First AAAI Conference on Artificial Intelligence.

Sepp Hochreiter and Jurgen Schmidhuber. 1997. Long short-term memory. Neural Computation, 9:1735-1780.

Zhiheng Huang, Wei Xu, and Kai Yu. 2015. Bidirectional lstm-crf models for sequence tagging. arXiv preprint arXiv:1508.01991.

Anette Hulth. 2003. Improved automatic keyword extraction given more linguistic knowledge. In EMNLP.

Su Nam Kim, Olena Medelyan, Min-Yen Kan, and Timothy Baldwin. 2010. SemEval-2010 task 5 : Automatic keyphrase extraction from scientific articles. In Proceedings of the 5th International Workshop on Semantic Evaluation, pp. 21-26, Uppsala, Sweden, July. Association for Computational Linguistics.

Su Nam Kim, Olena Medelyan, Min-Yen Kan, and Timothy Baldwin. 2013. Automatic keyphrase extraction from scientific articles. Language resources and evaluation, 47(3):723-742.

Mike Lewis, Yinhan Liu, Naman Goyal, Marjan Ghazvininejad, Abdelrahman Mohamed, Omer Levy, Ves Stoyanov, and Luke Zettlemoyer. 2019. Bart: Denoising sequence-to-sequence pre-training for natural language generation, translation, and comprehension. arXiv preprint arXiv:1910.13461.

Marina Litvak and Mark Last. 2008. Graph-based keyword extraction for single-document summarization. In Coling 2008: Proceedings of the workshop Multi-source Multilingual.

Information Extraction and Summarization, pp. 17-24, Manchester, UK, August. Coling 2008 Organizing Committee.

Debanjan Mahata, John Kuriakose, Rajiv Ratn Shah, and Roger Zimmermann. 2018. Key2Vec: Automatic ranked keyphrase extraction from scientific articles using phrase embeddings. In Proceedings of the 2018 Conference of the North American Chapter of the Association for Computational Linguistics: Human Language Technologies, vol. 2 (Short Papers), pp. 634-639, New Orleans, Louisiana, June. Association for Computational Linguistics.

Rui Meng, Sanqiang Zhao, Shuguang Han, Daqing He, Peter Brusilovsky, and Yu Chi. 2017. Deep keyphrase generation. In Proceedings of the 55th Annual Meeting of the Association for Computational Linguistics (vol. 1: Long Papers), pp. 582-592, Vancouver, Canada, July. Association for Computational Linguistics.

Eirini Papagiannopoulou and Grigorios Tsoumakas. 2018. Local word vectors guiding keyphrase extraction. Information Processing & Management, 54(6):888-902.

Matthew Peters, Mark Neumann, Mohit Iyyer, Matt Gardner, Christopher Clark, Kenton Lee, and Luke Zettlemoyer. 2018. Deep contextualized word representations. In Proceedings of the 2018 Conference of the North American Chapter of the Association for Computational Linguistics: Human Language Technologies, vol. 1 (Long Papers), pp. 2227-2237, New Orleans, Louisiana, June. Association for Computational Linguistics.

Dhruva Sahrawat, Debanjan Mahata, Haimin Zhang, Mayank Kulkarni, Agniv Sharma, Rakesh Gosangi, Amanda Stent, Yaman Kumar, Rajiv Ratn Shah, and Roger Zimmermann. 2020. Keyphrase extraction as sequence labeling using contextualized embeddings. In European Conference on Information Retrieval, pp. 328-335. Springer.

Lucas Sterckx, Cornelia Caragea, Thomas Demeester, and Chris Develder. 2016. Supervised keyphrase extraction as positive unlabeled learning. In Proceedings of the 2016 Conference on Empirical Methods in Natural Language Processing, pp. 1924-1929, Austin, Texas, November. Association for Computational Linguistics.

Yi Sun, Hangping Qiu, Yu Zheng, Zhihui Wang, and Chaoran Zhang. 2020. Sifrank: A new baseline for unsupervised keyphrase extraction based on pre-trained language model. IEEE Access, 8:10896-10906.

Xiaojun Wan and Jianguo Xiao. 2008. Single document keyphrase extraction using neighborhood knowledge. In Proceedings of the 23rd National Conference on Artificial Intelligence—vol. 2, AAAI 2008, p. 855-860. AAAI Press.

Yuxiang Zhang, Yaocheng Chang, Xiaoqing Liu, Sujatha Das Gollapalli, Xiaoli Li, and Chunjing Xiao. 2017. Mike: keyphrase extraction by integrating multidimensional information. In Proceedings of the 2017 ACM on Conference on Information and Knowledge Management, pp. 1349-1358.

(56) References Cited

OTHER PUBLICATIONS

Xun Zhu, Chen Lyu, Donghong Ji, Han Liao, and Fei Li. 2020. Deep neural model with self-training for scientific keyphrase extraction. Plos one, 15(5):e0232547.

* cited by examiner

UTILIZING A JOINT-LEARNING SELF-DISTILLATION FRAMEWORK FOR IMPROVING TEXT SEQUENTIAL LABELING MACHINE-LEARNING MODELS

BACKGROUND

Recent years have seen significant improvements in hardware and software platforms for training and utilizing machine-learning models. For example, many deep-learning methods have achieved promising performance in a wide range of natural language processing tasks. For example, some conventional systems utilize supervised and/or unsupervised machine learning techniques to analyze a digital document and identify representative phrases that concisely describe the content of the digital document. Notwithstanding these improvements, conventional systems continue to suffer from a number of problems in the field of natural language processing, and in particular, with regard to efficiency, accuracy, and flexibility of computer-implemented keyphrase extraction.

BRIEF SUMMARY

Implementations of the present disclosure provide benefits and/or solve one or more of the foregoing or other problems in the art with systems, non-transitory computer-readable media, and methods that accurately and efficiently utilize a joint-learning self-distillation approach to improve text sequence labeling machine-learning models. For instance, the disclosed systems provide a framework that utilizes both labeled and unlabeled training data along with multiple text sequence labeling models to automatically generate an efficient and accurate text sequence labeling model for keyphrase extraction.

To illustrate, in one or more implementations, the disclosed systems generate a text sequence labeling teacher model ("teacher model") to learn text sequence labels. Utilizing the teacher model, the disclosed systems can generate pseudo-ground truth labels for text sequences. Utilizing these pseudo-ground truth labels from the teacher model, the disclosed systems train a text sequence labeling student model ("student model") until the student model outperforms the teacher model. When the student model outperforms the teacher model with respect to keyphrase extraction, the disclosed systems replace the teacher model with the trained student model. In particular, the disclosed systems utilize the teacher model re-initialized with the learned parameters of the student model to generate additional pseudo-ground truth labels for additional text sequences. The disclosed systems then repeat the joint-learning self-distillation process described above for multiple iterations. In this manner, the disclosed systems efficiently and iteratively improve the accuracy of text sequence labeling machine-learning model for keyphrase extraction, even in the absence of high-volume, pre-labeled datasets.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
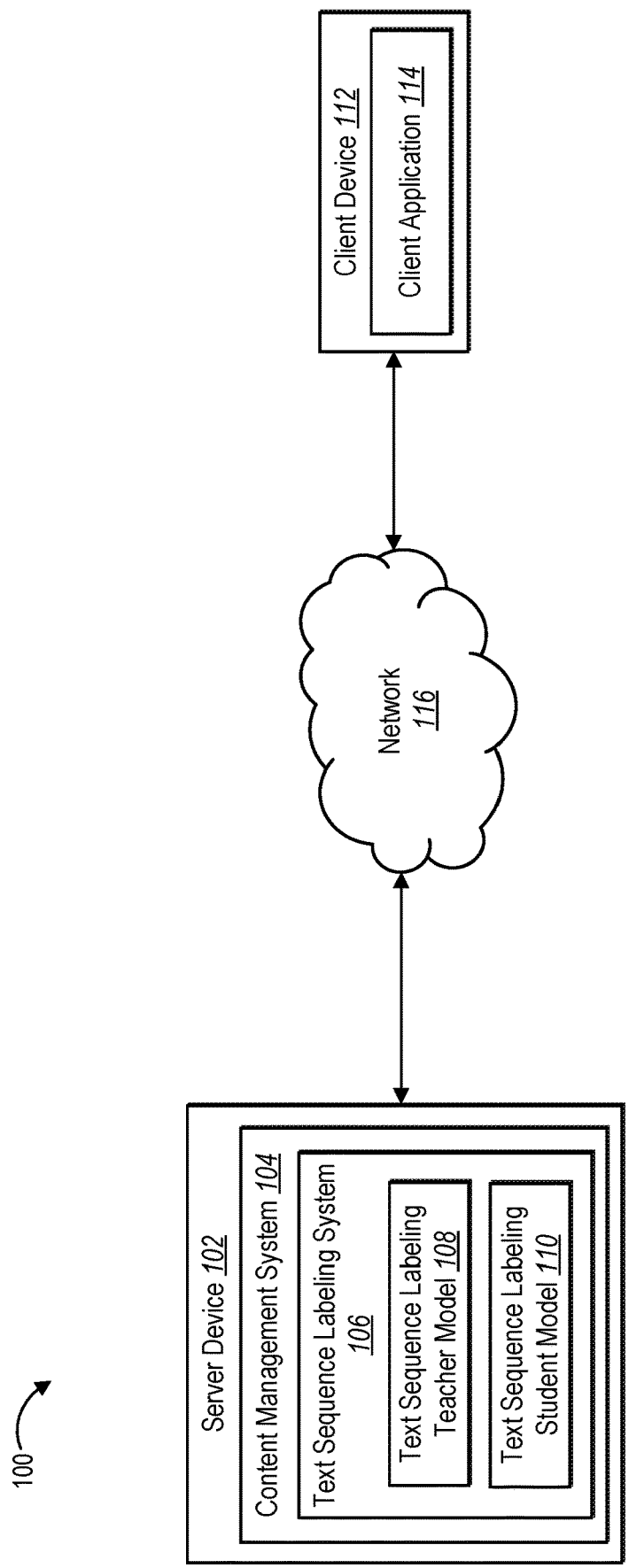
FIG. 1 illustrates a schematic diagram of a system environment in which a text sequence labeling system operates in accordance with one or more implementations.

This disclosure describes one or more implementations of a text sequence labeling system that generates accurate and efficient text sequence labels utilizing a joint learning, self-distillation framework across multiple text sequence labeling machine-learning models. For example, in various implementations, the text sequence labeling system trains a text sequence labeling teacher model ("teacher model") to generate text sequence labels. The text sequence labeling system then creates pseudo-ground truth text sequence labels utilizing the teacher model and trains a text sequence labeling student model ("student model") utilizing these pseudo-ground truth text sequence labels. Upon detecting that the student model achieves improved results over the teacher model, the text sequence labeling system re-initializes the teacher model with the learned model parameters of the student model. Moreover, the text sequence labeling systems generates additional pseudo-ground truth text sequence labels and repeats the above joint-learning self-distillation (JLSD) framework until training completes. Upon completing this training process, the text sequence labeling system utilizes the trained text sequence labeling model to generate text sequence labels (e.g., keyphrases) from input documents.

To illustrate, in one or more implementations, the text sequence labeling system learns a first set of model parameters of a first text sequence labeling machine-learning model (e.g., the teacher model) utilizing a labeled text data set having ground truth text sequence labels. Additionally, the text sequence labeling system generates a second set of ground truth text sequence labels (e.g., pseudo labels or pseudo-keyphrases) from an unlabeled data set based on the first learned set of model parameters. In various implementations, the text sequence labeling system utilizes the first set of learned model parameters to initialize a second text sequence labeling machine-learning student model (e.g., the student model). In addition, the text sequence labeling system learns a second set of model parameters at the student model based on the set of ground truth text sequence labels (e.g., the pseudo labels) generated by the teacher model. Moreover, based on identifying an improved validation output from the student model, the text sequence labeling system re-initializes the first teacher model with the second set of learned model parameters.

As mentioned above, in one or more implementations, the text sequence labeling system continues to implement the joint-learning self-distillation framework to further learn model parameters for generating accurate text sequence labels. For example, in various implementations, upon the teacher model being re-initialized with the second set of learned model parameters, the text sequence labeling system utilizes the teacher model to generate a third set of ground truth text sequence labels (e.g., additional pseudo labels) from additional unlabeled data. The text sequence labeling system then utilizes the additional unlabeled data along with the additional pseudo labels to learn a third set of model parameters at the student model.

In a number of implementations, upon the text sequence labeling system identifying a subsequently improved validation output from the second text sequence labeling model based on the third set of learned model parameters, the text sequence labeling system again re-initializes the teacher model with the third set of learned model parameters. Otherwise, in some implementations, the text sequence labeling system trains the student model for additional iterations or resets the student model to the previous set of learned model parameters (e.g., the second set of learned model parameters). In various implementations, each time the teacher model is re-initialized, the text sequence labeling system repeats the iterative joint-learning self-distillation framework described above until training is complete, as described below. In this manner, the text sequence labeling system progressively improves the accuracy of both the teacher model and the student model with respect to generating text sequence labels (e.g., keyphrases).

As mentioned above, the text sequence labeling system trains the teacher model utilizing a labeled data set having text data and corresponding ground truth text sequence labels. In one or more implementations, the teacher model generates predicted text sequence labels based on processing the text data from the labeled data set and comparing the predicted text sequence labels to the corresponding ground truth text sequence labels. Based on the comparison, the text sequence labeling system tunes the teacher model to generate the first set of learned model parameters.

With respect to training the student model, in one or more implementations, the text sequence labeling system trains the student model based on the unlabeled data and the additional pseudo labels generated by the teacher model. For example, in various implementations, the text sequence labeling system trains the student model with both the first ground truth set of text sequence labels from the labeled data set as well as the second ground truth set of text sequence labels (e.g., pseudo labels) to learn the second set of model parameters. Indeed, in many implementations, the text sequence labeling system utilizes both the first set of learned model parameters as well as the generated output of the teacher model to further tune and improve the model parameters in the student model.

As noted above, in one or more implementations, the text sequence labeling system determines that the student model generates an improved validation output over the teacher model. For instance, in some implementations, the text sequence labeling system utilizes a development or validation data set after one or more training iterations to evaluate the results of training the student model. As described below, in some implementations, the text sequence labeling system compares the validation output between multiple machine-learning models, or multiple versions of a machine-learning model, to determine when the validation output results in an improvement.

Once training is complete, in one or more implementations, the text sequence labeling system utilizes the trained set of model parameters to generate text sequence labels for unlabeled text data. For example, the text sequence labeling system receives an unlabeled document as part of an input query. In response, the text sequence labeling system processes the document with a trained text sequence labeling model to generate text sequence labels for the document.

As noted above, the text sequence labeling system trains and utilizes a text sequence labeling model (e.g., a machine-learning model). In one or more implementations, the text sequence labeling model includes a bidirectional long-short-term memory (BiLSTM) layer. In some implementations, the text sequence labeling model includes a transformer-based encoder, a dense layer, and/or a conditional random field (CRF) layer. Additional detail regarding example architectures of the teacher model is provided below.

As mentioned above, conventional systems suffer from a number of problems with regard to keyphrase extraction.

To illustrate, many conventional systems require significant computational processing and real-time memory resources to train these models. Further, many conventional systems struggle to accurately train deep-learning models to perform keyphrase extraction because datasets used to train these models are limited, both in the number of data sets available and data set sample size. Due to the lack of high-volume, accurate training data, conventional systems often produce poor and inaccurate results.

As a result of the relative sparsity of available training data, conventional systems are also rigid and inflexible. Indeed, because existing benchmark datasets for keyphrase extraction are often domain-specific, conventional systems are rigidly tied to the domains covered by these benchmark datasets. For example, conventional systems are inflexible in that they may extract keyphrases with regard to a certain field of technical documents (for which training data is available) but fail to accurately extract keyphrases with regard to other documents from other fields (for which training data is sparse).

One potential solution to these issues is to create additional training data. For example, some conventional systems rely on user interactions via graphical user interfaces (such as crowd sourcing) to generate training data. Given that machine learning models can require thousands or millions of samples in training, this approach requires substantial overhead, time, and resources to implement.

The text sequence labeling system provides numerous advantages and benefits over conventional systems. As described below, in many implementations, the text sequence labeling system improves both the accuracy and efficiency of computing devices as well as the technical field of utilizing machine-learning models for natural language processing and keyphrase extraction. To illustrate, the text sequence labeling system can improve accuracy relative to conventional systems by utilizing a teacher model and a student model to progressively improve both models. In this manner, the text sequence labeling system can create a monotonically, non-decreasing training performance that self corrects over time. As a result, at each iteration, the text sequence labeling system can regularly and consistently achieve improved accuracy with respect to training and utilizing text sequence labeling models that predict text sequence labels for an input document. Indeed, as described below, when tested against other conventional systems for keyphrase extraction, the text sequence labeling system yields improved results and new state-of-the-art benchmarks. Additional details regarding the text sequence labeling system empirically outperforming conventional systems are provided below in connection with Table 1.

In addition, the text sequence labeling system efficiently leverages unlabeled data sets. As mentioned above, conventional systems are largely hindered by the limited sets of labeled data. Rather, in one or more implementations, the text sequence labeling system leverages large amounts of unlabeled data to jointly learn text sequence labels. Indeed, the text sequence labeling system trains a text sequence labeling model in a semi-supervised approach utilizing both limited labeled data sets as well as large amounts of the unlabeled data.

As a result, the text sequence labeling system can also improve flexibility and performance relative to conventional systems. Indeed, unlike conventional systems, the text sequence labeling system is not rigidly tied to domains that already include benchmark, high-volume datasets. Rather, the text sequence labeling system can train accurate text sequence labeling models across a variety of fields and document types, even without large, high-volume datasets specific to individual document contexts.

Furthermore, in various implementations, the text sequence labeling system requires less overhead and resources than conventional systems. More particularly, the text sequence labeling system does not require the time and computational expense of generating ground truth data sets by monitoring user interface actions (e.g., through crowdsourcing), but learns through self-distillation. Indeed, by utilizing the teacher model to generate pseudo labels on-the-fly for training the student model, the text sequence labeling system can significantly reduce time and computational resources, even in training complex text sequence labeling machine-learning models.

Additional detail regarding the text sequence labeling system will now be provided with reference to the figures. For example, FIG. 1 illustrates a schematic diagram of a system environment 100 in which a text sequence labeling system 106 operates in accordance with one or more implementations. As shown in FIG. 1, the system environment 100 ("environment 100") includes a server device 102 and a client device 112 connected via a network 116. Additional detail regarding these computing devices is provided below in connection with FIG. 13. In addition, FIG. 13 also provides additional detail regarding networks, such as the illustrated network 116.

As shown, the server device 102 includes a content management system 104. In various implementations, the content management system 104 identifies, receives, accesses, opens, loads, edits, modifies, moves, copies, shares, saves, removes, deletes, stores, downloads, transmits, and/or imports digital content. An example of digital content includes digital documents or text files that include strings of words (e.g., text data). For instance, in some implementations, the content management system 104 is, or accesses, a large repository of digital documents that includes annotated (e.g., labeled) and unannotated (e.g., unlabeled) documents.

As illustrated, the content management system 104 includes a text sequence labeling system 106 (i.e., a text sequence labeling machine-learning model system). While shown within the content management system 104, in various implementations, the text sequence labeling system 106 is located apart from the content management system 104. Further, in some implementations, the text sequence labeling system 106 is implemented on a client device (e.g., the client device 112) or across multiple computing devices (e.g., on both the server device 102 and the client device 112).

In one or more implementations, the text sequence labeling system 106 trains and utilizes a text sequence labeling machine-learning model to generate text sequence labels (e.g., keyphrases). As further described below, in various implementations, the text sequence labeling system 106 jointly trains one or more machine-learning models, such as a text sequence labeling teacher model 108 ("teacher model 108") and a text sequence labeling student model 110 ("student model 110") to progressively learn to generate text sequence labels from text data. Further, once a set of model parameters are learned and refined, the text sequence labeling system 106 utilizes the trained text sequence labeling machine-learning model to generate text sequence labels from input documents.

By way of context, machine-learning models include algorithms that model high-level abstractions in data by generating data-driven predictions or decisions from the known input data. Examples of machine-learning models include computer representations that are tunable (e.g., trained) based on inputs to approximate unknown functions. For instance, a machine-learning model includes a model that utilizes algorithms to learn from, and make predictions on, known data by analyzing the known data to learn to generate outputs that reflect patterns and attributes of the known data. For example, machine-learning models include neural networks (described below), linear regression models, logistical regression models, random forest models, support vector machines (SVG) models, or decision tree models.

Further, in one or more implementations, a neural network includes a machine-learning model having interconnected artificial neurons (e.g., layers) that communicate and learn to approximate complex functions and generate outputs based on a plurality of inputs provided to the model. For instance, a neural network includes an algorithm (or set of algorithms) implementing deep-learning techniques to model high-level abstractions in data using supervisory data to tune parameters of the neural network. Examples of neural networks include a convolutional neural network (CNN), a residual learning neural network, a recurrent neural network (RNN) such as an LSTM, a generative adversarial neural network (GAN), and a single-shot detect (SSD) network. In one or more implementations, the text sequence labeling machine-learning model described herein represents one example of a bidirectional LSTM neural network with, or without, additional architecture.

As illustrated in FIG. 1, the environment 100 includes the client device 112. In some implementations, the client device 112 accesses the text sequence labeling system 106. For instance, a client application 114 (e.g., a web browser or a mobile application) on the client device 112 provides access to the text sequence labeling system 106. For example, the client application 114 facilitates generating text sequence labels (e.g., keyphrases) from an input document utilizing a trained text sequence labeling machine-learning model on the server device 102 and/or downloaded to the client device 112.

Although illustrated on the server device 102 in FIG. 1, in one or more implementations all, or a portion of, the text sequence labeling system 106 is located on the client device 112. For instance, the client device 112 hosts and implements the text sequence labeling system 106 and facilitates training the teacher model 108 and the student model 110. In another instance, the text sequence labeling system 106 jointly learns a set of model parameters on the server device 102 and provides the set of learned model parameters to the client device 112 to be implemented in a text sequence labeling machine-learning model. For example, the client application 114 on the client device 112 downloads an application from the server device 102 (e.g., a document editing application) or a portion of a software application that enables the client device to generate text sequence labels offline based on the set of learned model parameters.

Although FIG. 1 illustrates a particular number, type, and arrangement of components within the environment 100, various additional environment configurations are possible. For example, the server device 102 represents a set of connected server devices. Additionally, the server device 102 may communicate directly with the client device 112, bypassing the network 116, or utilizing a separate and/or an additional network. Further, the environment 100 may include additional components, such as a storage device that maintains a repository of digital content items (e.g., documents, articles, texts, etc.)

Figure 2:
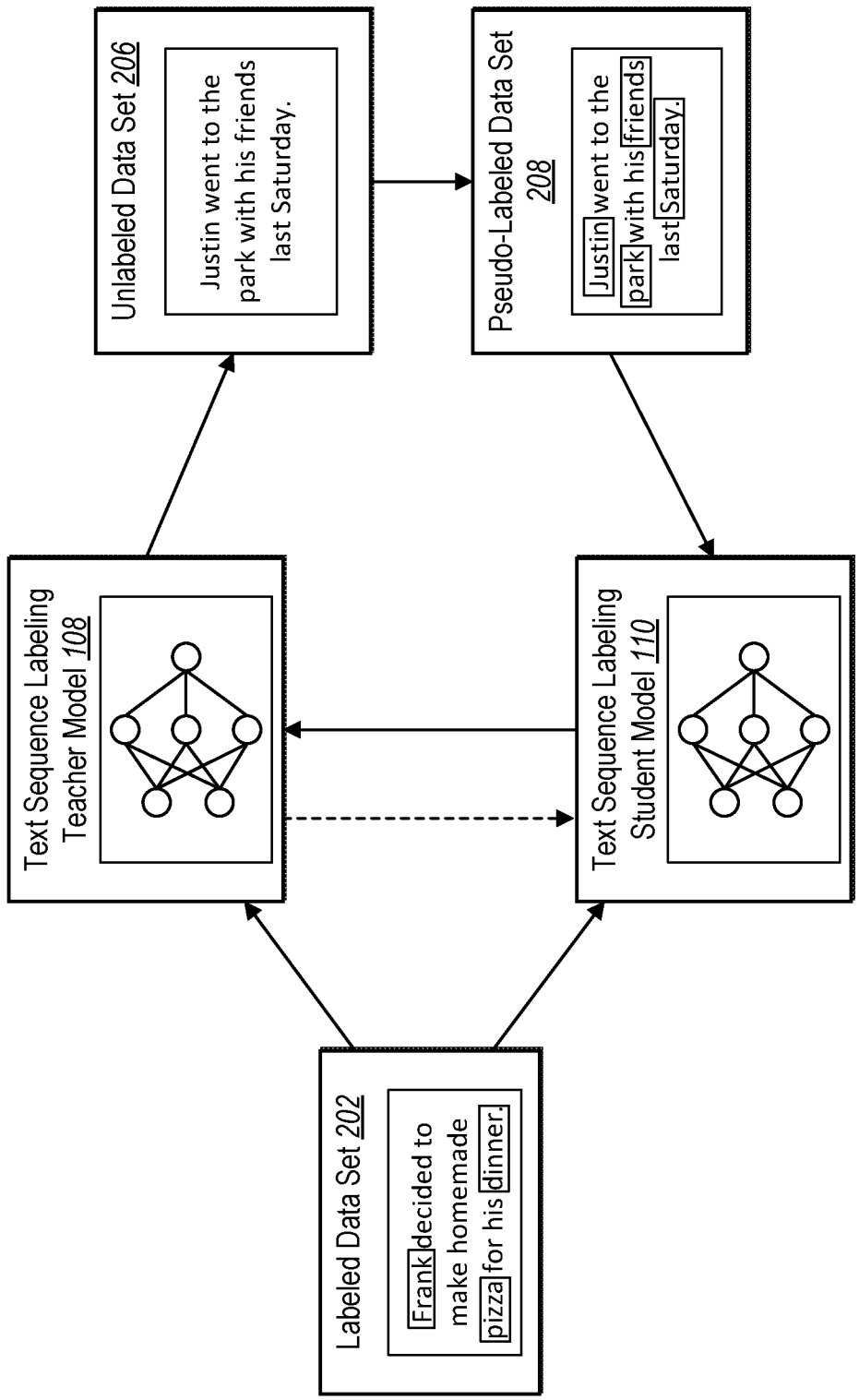
FIG. 2 illustrates an overview diagram of training a text sequence labeling model in accordance with one or more implementations.

As discussed above, the text sequence labeling system 106 can train text sequence labeling machine-learning models to generate text sequence labels. For example, FIG. 2 shows an overview of the text sequence labeling system 106 jointly training text sequence labeling machine-learning models in accordance with one or more embodiments. In particular, FIG. 2 includes a joint-learning self-distillation framework of training text sequence labeling models (i.e., text sequence labeling machine-learning models).

As shown, FIG. 2 illustrates that the text sequence labeling system 106 can access a labeled data set 202. In one or more implementations, the labeled data set 202 includes text data (e.g., words or tokens) from digital content (e.g., digital documents). For example, the labeled data set 202 can includes a repository of text documents. In addition, the labeled data set 202 a corresponding set of text sequence labels, which serves as ground truth text sequence labels, as described below. In many instances, text sequence labels are keyphrases (e.g., groups of words) or other annotations extracted from the text data. In many implementations, a keyphrase includes multiple words. In alternative implementations, a keyphrase includes a single word. Additional detail regarding labeled data sets is provided below with respect to FIG. 4.

As shown, the framework includes the text sequence labeling teacher model 108 ("teacher model 108"). In one or more implementations, the text sequence labeling system 106 utilizes the labeled data set 202 to train the teacher model 108 to generate text sequence labels. Additional detail regarding the teacher model 108 is provided below with respect to FIG. 6.

In some implementations, the teacher model 108 is a bidirectional LSTM neural network that processes text data from the labeled data set 202 to predict corresponding text sequence labels (e.g., keyphrases extracted from the text data). Further, in one or more implementations, the teacher model 108 includes additional layers or components for processing text data. Additional detail regarding the architecture of the teacher model 108 is provided below with respect to FIG. 4.

As shown in FIG. 2 the text sequence labeling system 106 can also access and utilize an unlabeled data set 206. In one or more implementations, an unlabeled data set includes text data without a corresponding set of text sequence labels. For instance, text annotations are not associated with the text data in an unlabeled data set. In some implementations, an unlabeled data set includes text sequence labels, but they are inadequate or insufficient (e.g., the labels are subjective, non-uniform, and/or poorly represent the text data).

In various implementations, the text sequence labeling system 106 processes the unlabeled data set 206, or a portion thereof, utilizing the trained teacher model 108. For example, the text sequence labeling system 106 generates pseudo-text sequence labels to create a pseudo-labeled data set 208, as shown in FIG. 2. In various implementations, pseudo-text sequence labels are text sequence labels predicted for the text data from the unlabeled data set 206. In this manner, the text sequence labeling system 106 converts the unlabeled data set 206 into the pseudo-labeled data set 208 by correlating the text data of the unlabeled data set 206 with corresponding pseudo-text sequence labels. Additional detail regarding generating pseudo-text sequence labels is described below with respect to FIG. 7.

As shown in FIG. 2, the text sequence labeling system 106 can train the text sequence labeling student model 110 ("student model 110"). In various implementations, the student model 110 is copied from the trained teacher model 108 (shown by the dashed arrow). For example, the text sequence labeling system 106 initializes the student model 110 to match the trained teacher model 108.

In one or more implementations, the text sequence labeling system 106 trains the student model 110 utilizing the labeled data set 202 and the pseudo-labeled data set 208. Indeed, the text sequence labeling system 106 trains the student model 110 with the labeled data set 202 and pseudo-text sequence labels (i.e., the pseudo-labeled data set 208) generated by the teacher model 108. Additional detail regarding training the student model 110 is provided below with respect to FIG. 8.

As mentioned above, in one or more implementations, the text sequence labeling system 106 trains the student model 110 using the trained teacher model 108 as a baseline model. Further, in various implementations, the text sequence labeling system 106 determines whether the trained student model 110 yields improved results over the teacher model 108. Indeed, in various implementations, the text sequence labeling system 106 compares validation outputs between the two models to determine whether the student model 110 has improved over the teacher model 108. Additional detail regarding validating text sequence labeling machine-learning models is provided below with regard to FIG. 9.

In one or more implementations, if the student model 110 improves over the teacher model 108, the text sequence labeling system 106 overwrites the teacher model 108 with the trained student model 110. Indeed, as shown by the solid arrow in FIG. 2 from the student model 110 to the teacher model 108, the text sequence labeling system 106 re-initializes the teacher model 108 to match the trained student model 110.

In one or more implementations, the text sequence labeling system 106 repeats the actions described above with respect to FIG. 2. For example, the text sequence labeling system 106 utilizes the updated teacher model 108 to generate a new set of pseudo-text sequence labels from the unlabeled data set 206 (e.g., the same or different unlabeled text data) to create another pseudo-labeled data set 208. Next, the text sequence labeling system 106 further trains the student model 110 with the labeled data set 202 and the new pseudo-labeled data set 208 to further learn and fine-tune the accuracy of the model. The text sequence labeling system 106 then replaces the teacher model 108 with the re-trained and newly updated student model 110, as shown in FIG. 2. Indeed, in various implementations, the text sequence labeling system 106 continues to repeat these actions until one or more training conditions are met, as further described below.

Additionally, upon completing training, in one or more implementations, the text sequence labeling system 106 generates text sequence labels for unlabeled documents. For example, the text sequence labeling system 106 utilizes the trained student model 110 or the re-initialized teacher model 108 to process text data from an unlabeled document and generate text sequence labels. Additional detail regarding utilizing a trained text sequence labeling machine-learning model is provided below with respect to FIG. 10.

Figure 3:
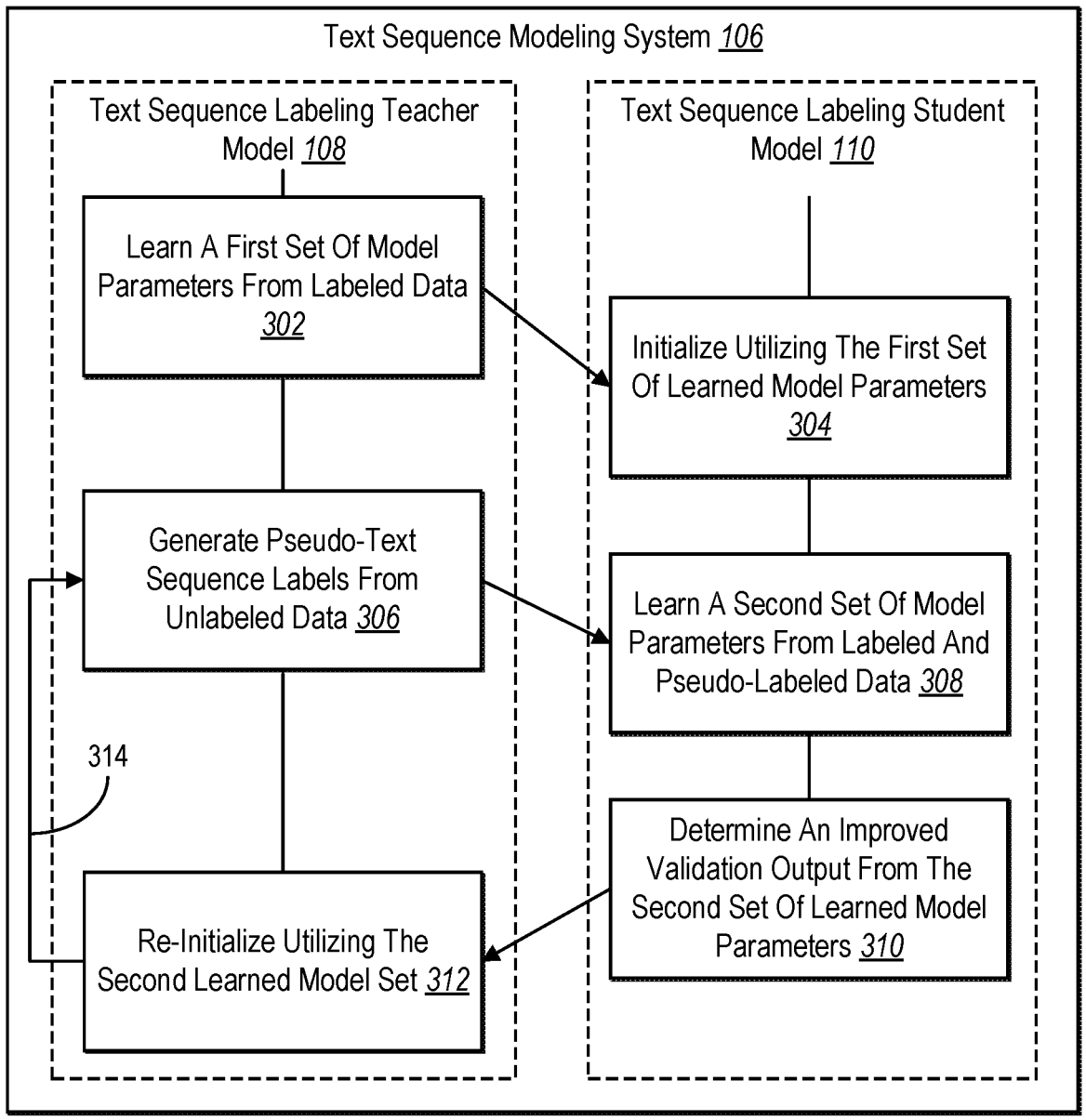
FIG. 3 illustrates a sequence diagram of dynamically learning and utilizing model parameter sets across the text sequence labeling models in accordance with one or more implementations.

As mentioned above, in one or more implementations, the text sequence labeling system 106 repeats the actions of jointly training the teacher model 108 and the student model 110. To further illustrate, FIG. 3 shows a sequence diagram of dynamically learning and utilizing sets of model parameters across the text sequence labeling models in accordance with one or more implementations. In the sequence diagram, time advances from top to bottom.

As shown, FIG. 3 includes the text sequence labeling system 106, which includes multiple machine-learning models, such as the text sequence labeling teacher model 108 ("teacher model 108") and the text sequence labeling student model 110 ("student model 110)." FIG. 3 illustrates a series of acts performed by the text sequence labeling system 106 with respect to the teacher model 108 and the student model 110. Indeed, while some actions in FIG. 3 are described with respect to the teacher model 108 and the student model 110, the text sequence labeling system 106 performs or facilitates these actions.

To illustrate, FIG. 3 includes an act 302 of the teacher model 108 learning a first set of model parameters from labeled data. For instance, in one or more implementations, the text sequence labeling system 106 initially creates a teacher model 108 with default and/or random model parameters. Further, the text sequence labeling system 106 utilizes the labeled data to train the model parameters of the teacher model 108. For example, and as further described below with respect to FIG. 6, the text sequence labeling system 106 utilizes text data and corresponding text sequence labels (e.g., ground truth text sequence label) from a labeled data set to tune the first set of learned model parameters.

As mentioned above, the teacher model 108 and the student model 110 include machine-learning model parameters (e.g., a "set of model parameters" or "model parameters"). In some instances, model parameters include one or more values or weights that influence how a portion of the model processes data. For example, a machine-learning model that includes multiple neural network layers receives data at a layer, modifies the data based on an algorithm that is influenced by one or more model parameters, and outputs the modified data (e.g., either to another layer or as a final output). During training, the model parameters in the layer are tuned to generate more accurate predictions. Accordingly, the machine-learning model "learns" as it tunes the machine-learning model weights and parameters (e.g., "learned model parameters") to generate more accurate predictions.

Additionally, in various implementations, model parameters are imported and/or exported into another machine-learning model. For example, in various implementations, the text sequence labeling system exports a set of learned model parameters from one machine-learning model (e.g., a teacher model), then imports (or initializes) the set of learned model parameters into another machine-learning model (e.g., a student model or vice versa).

To illustrate, FIG. 3 includes an act 304 of the text sequence labeling system 106 initializing the student model 110 utilizing the first set of learned model parameters. For example, in one or more implementations, the text sequence labeling system 106 initializes the student model 110 by importing or loading the first set of model parameters learned at the teacher model 108. Indeed, in various implementations, the text sequence labeling system 106 duplicates the teacher model 108 when creating the student model 110.

As shown in FIG. 3, the text sequence labelling system 106 also performs an act 306 (via the teacher model 108) of generating pseudo-text sequence labels from unlabeled data. For example, in one or more implementations, the text sequence labeling system 106 processes text data from an unlabeled data set to generate corresponding text sequence labels. Because the text sequence labeling system 106 is still jointly training the teacher model 108 and student model 110, the accuracy of the teacher model 108 continues to evolve and improve. Accordingly, the text sequence labeling machine-learning model generated by the student model 110 serve as pseudo-text sequence labels (e.g., pseudo-ground truth text sequence labels) for the unlabeled data set.

In addition, FIG. 3 also illustrates the text sequence labeling system performing an act 308 (via the student model 110) of learning a second set of model parameters from the labeled data and the pseudo-labeled data. For example, in one or more implementations, the text sequence labeling system 106 trains the student model 110 utilizing the text data and corresponding ground truth text sequence labels from the labeled data set as well as text data from the unlabeled data set and the corresponding pseudo-text sequence labels. Accordingly, the text sequence labeling system 106 trains the student model 110 in a semi-supervised manner from both confirmed as well as estimated ground truths.

In one or more implementations, the text sequence labeling system 106 utilizes the same text data from the labeled data used to train the teacher model 108. In alternative implementations, the text sequence labeling system 106 utilizes the same labeled data set to train the teacher model 108 and the student model 110 but utilizes different samples of text data. In some implementations, the text sequence labeling system 106 utilizes another labeled data set to train the teacher model 108 and the student model 110.

In various implementations, when training the student model 110, the text sequence labeling system 106 utilizes a greater number of samples from the pseudo-labeled data than from the labeled data set, as described below. For example, in some implementations the text sequence labeling system 106 utilizes four times the samples from the unlabeled data set than from the labeled data set. In this manner, the text sequence labeling system 106 leverages the vast amounts of unlabeled data to accurately train the student model 110.

In addition, while FIG. 3 shows the act 306 occurring before the act 308, these acts may occur in any order. For example, in one or more implementations, the act 308 occurs before the act 306. In alternative implementations, the acts 306 and 308 occur at the same time or overlap in time. Indeed, in some implementations, the teacher model 108 generates pseudo labels on-the-fly while the text sequence labeling system 106 trains the student model 110 (e.g., during each joint-learning iteration).

As shown in FIG. 3, the text sequence labeling system 106 also performs an act 310 of determining (via the student model 110) an improved validation output from the second set of learned model parameters. For example, in one or more implementations, the text sequence labeling system 106 generates validation outputs from the teacher model 108 and the student model 110, then compares the validation outputs to determine whether the second set of learned model parameters outperforms the first set of learned model parameters.

As mentioned above, in various implementations, the text sequence labeling system 106 compares the performance between different machine-learning models utilizing validation outputs (i.e., a validation metric). In some instances, the term "different machine-learning models" refers to two different machine-learning models (e.g., a teacher model and a student model). In some instances, the term "different machine-learning models" refers to the same machine-learning model having different sets of learned parameters (e.g., a first set of learned model parameters and a second set of learned model parameters) or a different network architecture. To illustrate, in some implementations, the text sequence labeling system 106 utilizes validation outputs to compare the teacher model 108 and the student model 110, or more particularly, the first set of learned model parameters and the second set of learned model parameters.

Additionally, in one or more implementations, the text sequence labeling system 106 utilizes a validation data set (or a portion of a labeled data set) to generate a validation output. For example, the text sequence labeling system 106 provides the same or different text data from a valuation data set to the different machine-learning models to process and generate validation outputs. The text sequence labeling system 106 then compares the validation outputs between the models to determine whether model improvement occurs, as described below.

In many implementations, the text sequence labeling system 106 determines that the second set of learned model parameters from the student model 110 outperforms the first set of learned model parameters from the teacher model 108. In these implementations, the text sequence labeling system 106 copies the second set of learned model parameters to the teacher model 108. More specifically, as shown in an act 312, the text sequence labeling system 106 re-initializes the teacher model 108 utilizing the second set of learned model parameters. For example, the text sequence labeling system 106 overwrites the first set of learned model parameters at the teacher model 108 with the second set of learned model parameters based on the second set of learned model parameters outperforming the first set of learned model parameters. In this manner, the text sequence labeling system 106 updates the teacher model 108 to predict more accurate text sequence labels during the joint-learning self-distillation framework.

As mentioned above, in various implementations, the text sequence labeling system 106 repeats the joint-learning self-distillation framework to further improve the teacher model 108 and the student model 110. For example, as shown in FIG. 3 by the arrow 314, the text sequence labeling system 106 rounds from the act 312 back to the act 306. Indeed, in one or more implementations, the text sequence labeling system 106 repeats the acts 306-312 to progressively refine both the teacher model 108 and the student model 110.

To illustrate, upon looping back to the act 306, in one or more implementations, the text sequence labeling system 106 again performs the act 306 of generating additional pseudo-text sequence labels from unlabeled data. Here, because the teacher model 108 has been re-initialized with the second set of learned model parameters, the teacher model 108 utilizes the second set of learned model parameters to generate additional pseudo-text sequence labels.

In some instances, the teacher model 108 processes the same text data as before to generate more accurate pseudo-text sequence labels. In additional or alternative instances, the teacher model 108 processes different text data to generate the additional pseudo-text sequence labels. For example, the different text data can come from the same or a different unlabeled data set.

Next, utilizing the additional pseudo-text sequence labels from unlabeled data, the text sequence labeling system 106 trains the student model 110 to learn a third (e.g., updated) set of learned model parameters (e.g., repeating the act 308). As described above, the text sequence labeling system 106 further trains the student model 110 utilizing a labeled data set and pseudo-labeled data based on the additional pseudo-text sequence label generated by the teacher model 108 (e.g., the labeled data and pseudo-labeled data serving as ground truth text sequence labels). Further, the text sequence labeling system 106 determines that the third set of learned model parameters achieves an improved validation output over the second set of learned model parameters (e.g., repeating the act 310) and, in response, again re-initializes the teacher model 108 with the third set of learned model parameters (e.g., repeating the act 312).

In various implementations, the text sequence labeling system 106 continues to repeat the acts 306-312 until one or more training conditions are met. For example, in one or more implementations, the text sequence labeling system 106 jointly trains the teacher model 108 and the student model 110 for a set number of training iterations. In some implementations, the text sequence labeling system 106 trains until the accuracy of the set of learned model parameters meets an accuracy threshold and/or the error metric falls below an error threshold, as described below.

As shown, repeating the acts 306-312 produces a virtuous cycle in which both the teacher model 108 and the student model 110 become better together. Indeed, a better teacher model 108 generates more accurate pseudo-text sequence labels, which in turn helps train a better student model 110. The improved student model 110 is then used to re-initialize the teacher model 108. Notably, during a joint-learning iteration, if the teacher model 108 generates a poor or incorrect pseudo-text sequence label, the effect is minimal as the teacher model 108 will self-correct in a future joint-learning iteration if it comes across the same input text data. In this manner, the performance of the teacher model 108 is monotonically non-decreasing over time.

As described, utilizing different models in the present disclosure can include using the same machine learning model architecture with different parameters. Thus, the description of FIG. 3 with regard to the teacher model 108 and the student model 110, can include performing the described acts with a single architecture having different parameters at different points in the sequence. For example, the text sequence labeling system 106 initially trains a text sequence labeling model with labeled data to create the first set of learned model parameters, then utilizes the trained model to generate pseudo-text sequence labels. Additionally, the text sequence labeling system 106 further trains the model using the labeled data and pseudo-text sequence labels to generate the second set of learned model parameters, as described above. Further, if the text sequence labeling system 106 determines that the second (or an updated) set of learned model parameters outperforms the first (or a previous) set of learned model parameters, the text sequence labeling system 106 generates additional pseudo-text sequence labels with the second set (or updated) of learned model parameters. Moreover, in example implementations, the text sequence labeling system 106 repeats the actions described until training concludes.

Figure 4:
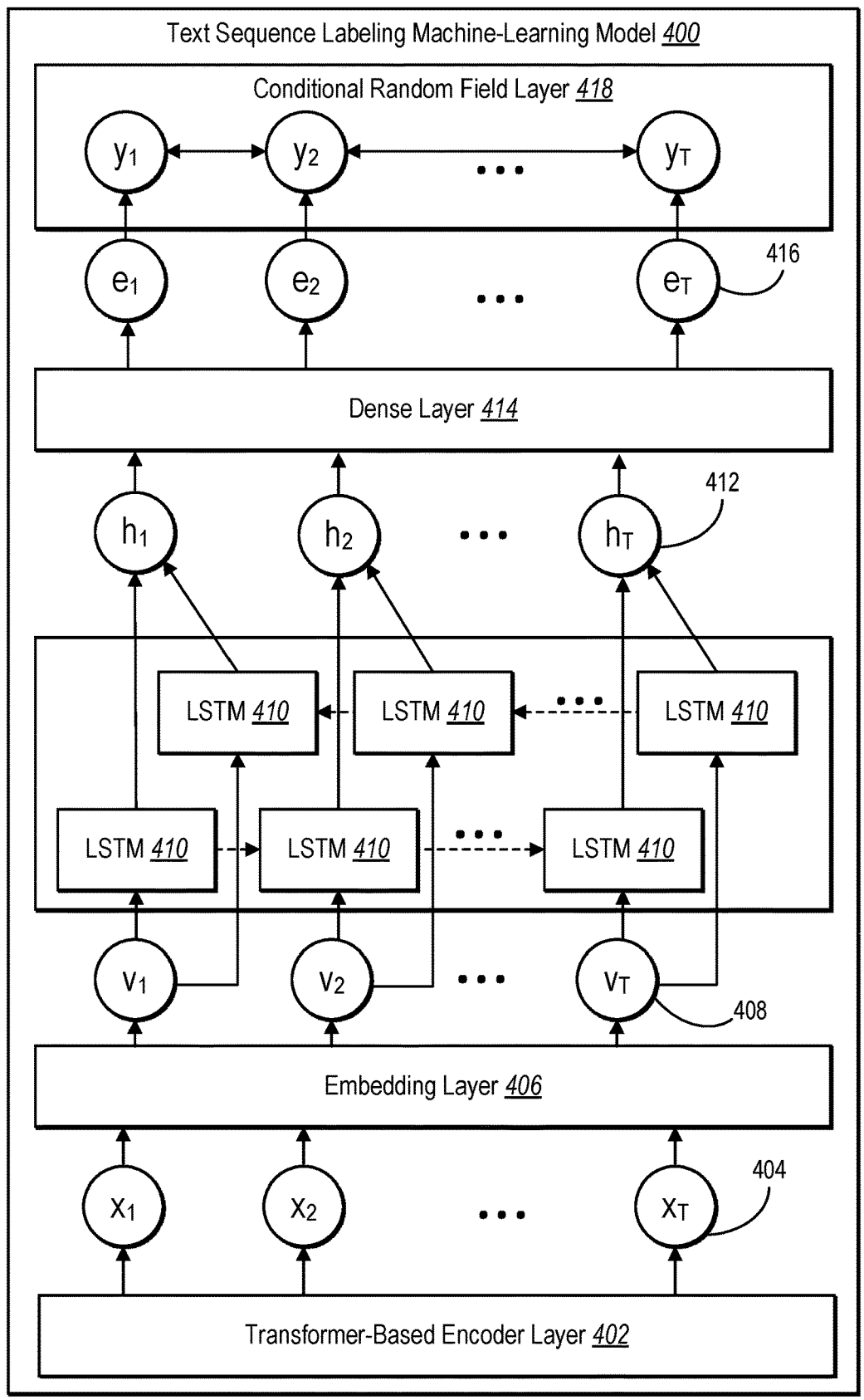
FIG. 4 illustrates a block diagram of an example architecture for a text sequence labeling machine-learning model in accordance with one or more implementations.
Figure 5:
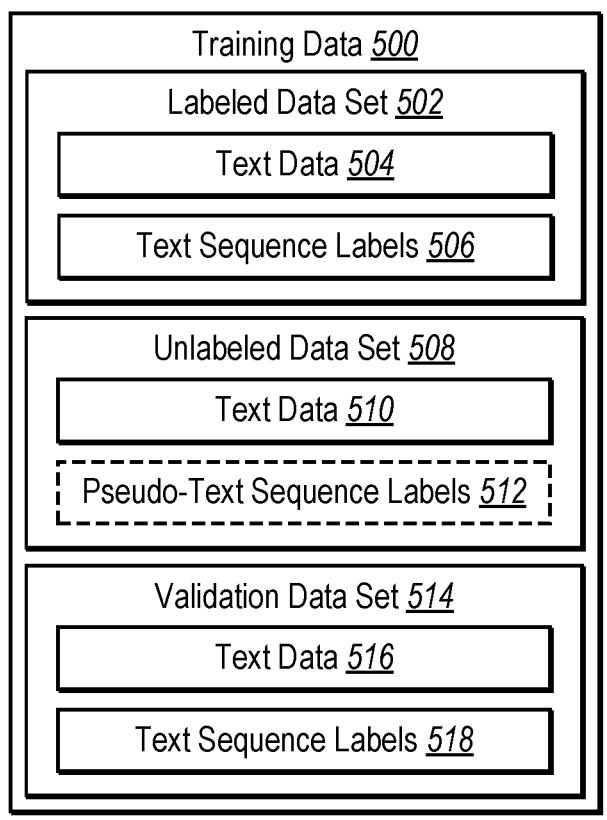
FIG. 5 illustrates a block diagram of training data utilized for training text sequence labeling models in accordance with one or more implementations.
Figure 6:
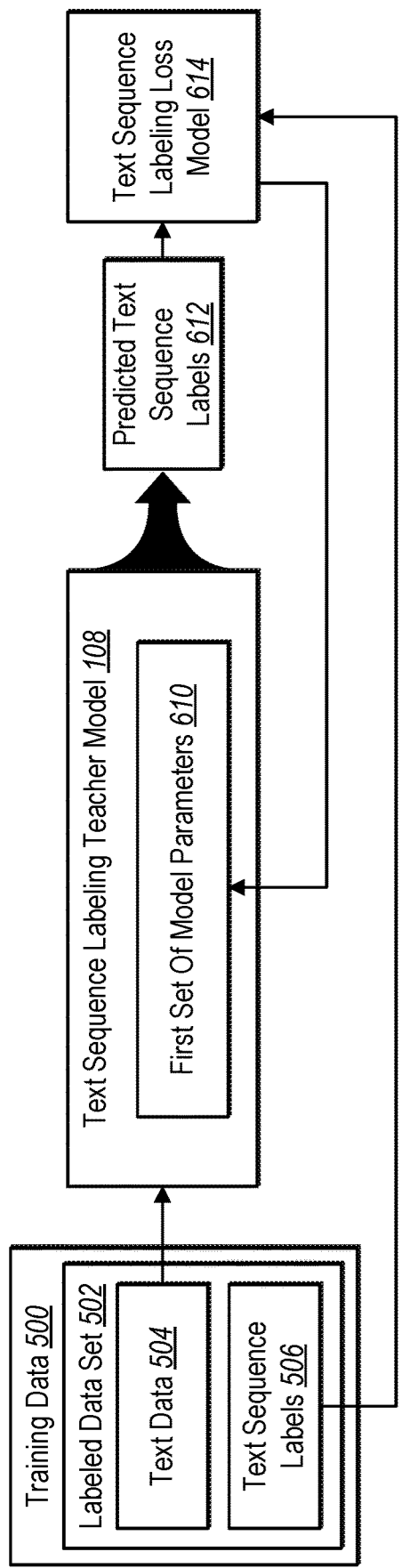
FIG. 6 illustrates a block diagram of training a text sequence labeling teacher model in accordance with one or more implementations.
Figure 7:
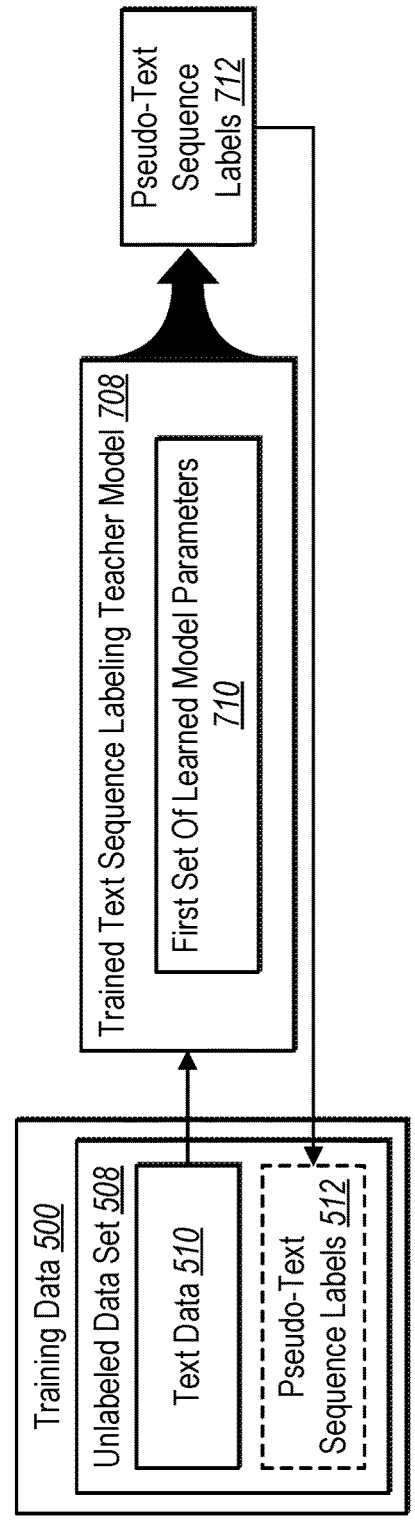
FIG. 7 illustrates a block diagram of utilizing the trained text sequence labeling teacher model to generate pseudo-text sequence labels in accordance with one or more implementations.
Figure 8:
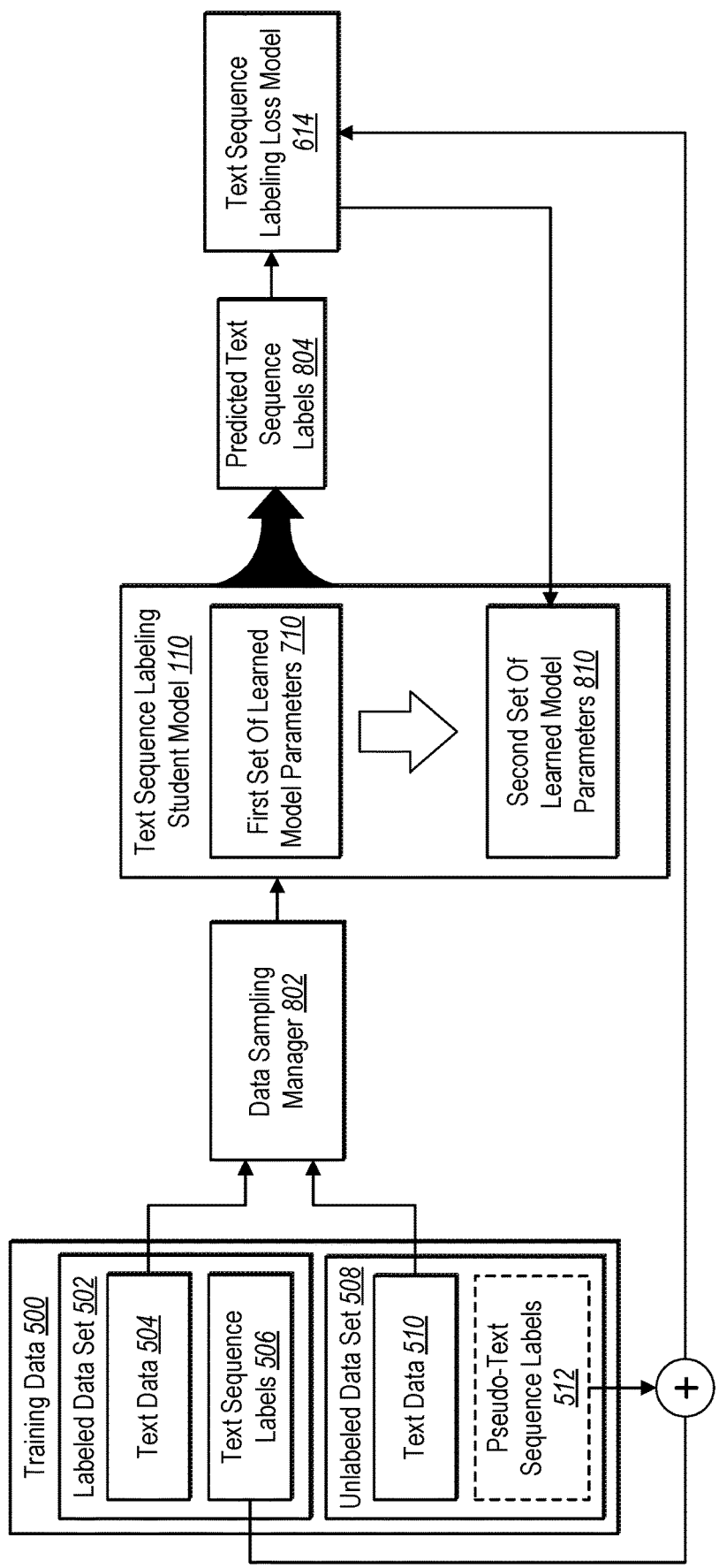
FIG. 8 illustrates a block diagram of training a text sequence labeling student model in accordance with one or more implementations.

Turning now to FIGS. 4-8, additional detail is provided with respect to creating, and training text sequence labeling models. For example, FIG. 4 shows an example architecture of a text sequence labeling model, FIG. 5 shows various data sets used to train the text sequence labeling models, FIG. 6 shows training a text sequence labeling teacher model, FIG. 7 shows utilizing a text sequence labeling model to generate pseudo-text sequence labels, and FIG. 8 shows training a text sequence labeling machine-learning student model.

As illustrated, FIG. 4 shows a block diagram of an example architecture for a text sequence labeling model 400 (i.e., a text sequence machine-learning model labeling model or text sequence labeling neural network) in accordance with one or more implementations. While the shows a particular architecture, the text sequence labeling model 400 may include additional or fewer layers and components. Further, in alternative implementations, the text sequence labeling system 106 utilizes different sequence neural network layers and/or machine-learning models than illustrated.

As shown in FIG. 4, the text sequence labeling model 400 includes multiple neural network layers ("layers"). Each illustrated layer represents one or more types of neural network layers and/or includes an embedded neural network. In general, at each layer, input data is transformed into a more useable form for the next layer (e.g., by changing the dimensionality of the input), which enables the text sequence labeling model 400 to analyze features at different levels of abstraction and learn weights and model parameters for training text sequence labels. As illustrated, the text sequence labeling model 400 includes a transformer-based encoder layer 402, an embedding layer 406, an LSTM layer 410, a dense layer 414, and a conditional random field layer 418.

As mentioned above, the text sequence labeling model 400 includes the transformer-based encoder layer 402. In one or more implementations, the transformer-based encoder layer 402 includes a transformer-based encoder model or neural network that encodes inputted text data (e.g., words or tokens) and outputs encoded token vectors 404. In example implementations, the transformer-based encoder is pre-trained. In some implementations, the transformer-based encoder layer 402 utilizes a transformer-based encoder to contextually represent each received token. For example, the text sequence labeling system 106 provides the tokens $t_1, t_2, \ldots t_T$ to the transformer-based encoder, which encodes the tokens into the encoded token vectors 404 (e.g., $x_1, x_2, \ldots x_T$). In alternative embodiments, the text sequence labeling model 400 does not include the transformer-based encoder and/or utilizes other or additional encoding methods to encode text data (e.g., one-hot or weighted matrix encoding).

As shown, the text sequence labeling model 400 also includes the embedding layer 406. In general, the embedding layer 406 quantifies and categorizes hidden contextual similarities between tokens. As illustrated, the embedding layer 406 transforms the encoded token vectors 404 (e.g., changes the dimensionality of the input) to input vectors 408 (e.g., $v_1, v_2, \ldots v_T$).

In addition, as mentioned above, the text sequence labeling model 400 includes the LSTM layer 410. In one or more implementations, the LSTM layer 410 includes bidirectional LSTM (BiLSTM) neural networks. In various implementations, the LSTM neural networks are a type of RNN model. In alternative implementations, instead of LSTMs, the text sequence labeling model 400 includes another type of memory-based neural network, as the LSTM layer 410.

In various implementations, the LSTM layer 410 incorporates the specific sequence of tokens in the text data. In this manner, the LSTM layer 410 enables the text sequence labeling system 106 to encode contextual information from adjacent tokens (e.g., words) into each token during training and execution. Indeed, the LSTM layer 410 models sequential inputs by integrating the time-series sequence of previous and future tokens into each token. More specifically, in various embodiments, the LSTM layer 410 transforms the input vectors 408 to create hidden state vectors 412, shown as $h_1, h_2, \ldots h_T$. As shown, the hidden state vectors 412 are based on the input vectors 408 and the hidden state vectors from previous and/or subsequence tokens from the text data (e.g., $h_{t-1}$ and/or $h_{t+1}$).

As mentioned above, the text sequence labeling model 400 includes the dense layer 414. In one or more implementations, the dense layer maps the output of the bidirectional LSTM to a label space (e.g., a text sequence labeling space). In some implementations, the dense layer 414 utilizes a weighted matrix to map the hidden state vectors 412 (e.g., $h_1, h_2, \ldots h_T$) into dense vectors 416 (e.g., feature vectors), shown as $e_1, e_2, \ldots e_T$, which reside in the multidimensional vector label space.

As shown, the text sequence labeling model 400 includes the conditional random field layer 418 ("CRF layer 418"). In one or more implementations, the CRF layer 418 includes a CRF model or network that converts the dense vectors 416 into text sequence labels. For example, in some implementations, the CRF layer 418 includes a linear-chain CRF model that decodes the dense vectors 416 from the label space into the text sequence labels. In this manner, the CRF layer 418 outputs text sequence labels that represent the keyphrases corresponding to the text data inputted into the text sequence labeling model 400.

As mentioned above, FIG. 5 illustrates training data 500 utilized for jointly training text sequence labeling machine-learning models in accordance with one or more implementations. For example, as described previously, the text sequence labeling system 106 utilizes one or more text data sets to train the various text sequence labeling machine-learning models. As illustrated, the training data 500 includes various text data sets, such as a labeled data set 502, an unlabeled data set 508, and a validation data set 514. While not shown, the training data 500 can include additional data sets, such as a testing data set.

As mentioned above, the training data 500 includes the labeled data set 502, which includes text data 504 and text sequence labels 506. For example, in one or more implementations, the text data 504 corresponds to words in documents and the text sequence labels 506 corresponds to keyphrases extracted from corresponding documents. As described above, a keyphrase commonly includes a string of two or more adjacent words (or acronym) extracted from a document. In some implementations, a keyphrase includes words corresponding to, but not found in, a document. In some implementations, a keyphrase includes a single work from a document.

As described herein, in various implementations, the text sequence labeling system 106 utilizes the labeled data set 502 to train text sequence labeling machine-learning models. For instance, the text sequence labeling system 106 trains the teacher model 108 utilizing the labeled data set 502, with the text sequence labels 506 serving as a ground truth. In addition, the text sequence labeling system 106 trains the student model 110, in part, based on the labeled data set 502.

As shown, the training data 500 includes the unlabeled data set 508, which includes text data 510. In many implementations, the unlabeled data set 508 does not include a corresponding set of text sequence labels. Accordingly, the text sequence labeling system 106 cannot initially use the unlabeled data set 508 to train text sequence labeling machine-learning models. Moreover, as described above, in many instances, the unlabeled data set 508 is much larger than the labeled data set 502 because labeled data is often sparse compared to unlabeled data.

In example implementations, the text sequence labeling system 106 generates a set of text sequence labels for the unlabeled data set 508. For example, a trained text sequence labeling model processes the text data 510 from the unlabeled data set 508 to extract corresponding text sequence labels (keyphrases). Accordingly, as shown, the unlabeled data set 508 includes pseudo-text sequence labels 512 in various implementations. In these implementations, the text sequence labeling system 106 is able to utilize the pseudo-text sequence labels 512 as a ground truth for training a text sequence labeling machine-learning model, as described below.

As shown, the training data 500 includes the validation data set 514, which includes text data 516 and text sequence labels 518. In one or more implementations, the validation data set 514 is a subset or portion of the labeled data set 502. For example, the labeled data set 502 is divided to include a testing data subset, a validation data subset, and/or a testing data subset. As further described below, in various implementations, the text sequence labeling system 106 utilizes the validation data set 514 to compare different text sequence labeling models and/or different learned model parameters of a text sequence labeling model.

Turning now to FIGS. 6-7, additional details regarding training and utilizing the teacher model 108 are provided. For instance, FIG. 6 illustrates a block diagram of training a text sequence labeling teacher model 108 ("teacher model 108") in accordance with one or more implementations. As shown, FIG. 6 includes the training data 500, the teacher model 108, predicted text sequence labels 612, and a text sequence labeling loss model 614. As mentioned above with respect to FIG. 4, in various implementations, the teacher model 108 includes a bidirectional LSTM model, a transformer-based encoder, and/or a CRF.

In one or more implementations, the text sequence labeling system 106 utilizes the training data 500 to train the teacher model 108. For example, the text sequence labeling system 106 creates the teacher model 108 by initializing the first set of model parameters 610 with a set of default or random model parameters. In some implementations, the text sequence labeling system 106 utilizes a pre-trained set of parameters to initialize the teacher model 108.

Next, in various implementations, the text sequence labeling system 106 begins processing the text data 504 from the labeled data set 502 at the teacher model 108. For instance, the teacher model 108 encodes the text data 504 (e.g., utilizing a transformer-based encoder), processes the encoded data through various layers of the teacher model 108 (e.g., utilizing the Bi-LSTM model and dense layer), then decodes the processed data (e.g., utilizing the CRF). Indeed, in example implementations, the teacher model 108 generates predicted text sequence labels 612 corresponding to the inputted text data 504.

In one or more implementations, during training, the text sequence labeling system 106 provides the predicted text sequence labels 612 to the text sequence labeling loss model 614. In various embodiments, the text sequence labeling loss model 614 compares the predicted text sequence labels 612 generated by the teacher model 108 (e.g., extracted from the input text data) to corresponding text sequence labels 506 from the labeled data set 502, which serve as ground truths, to determine a loss metric (e.g., a label prediction loss). In general, a loss model (e.g., loss function) identifies indicates classification loss amounts between predicted text sequence labeling model and ground truth text sequence labeling model. In some implementations, the loss model compares corresponding feature vectors in multidimensional vector space. In some instances, the loss model utilizes hinge loss, cross-entropy loss, sigmoid loss, mean absolute error loss (e.g., L1 loss), and/or mean square error loss (e.g., L2 loss).

Further, in one or more implementations, the text sequence labeling system 106 utilizes the label prediction loss to train and optimize the neural network layers of the teacher model 108 via backpropagation and/or end-to-end learning to minimize the label prediction loss. For example, as shown in FIG. 6, the text sequence labeling system 106 back propagates the label prediction loss to tune the first set of model parameters 610 of the teacher model 108. In various implementations, the text sequence labeling system 106 iteratively tunes and trains the teacher model 108 utilizing the labeled data set 502 to learn a set of best-fit parameters (i.e., a first set of learned model parameters) that predicts accurate text sequence labels.

In various implementations, the text sequence labeling system 106 utilizes multiple learning rates when training the teacher model 108. For example, in one or more implementations, the text sequence labeling system 106 applies a first learning rate to the transformer encoder. The text sequence labeling system 106 then utilizes a second learning rate to the upper layers of the teacher model 108 (e.g., the LSTM layer or dense layer).

Once trained, the text sequence labeling system 106 utilizes the teacher model 108 to extract text sequence labels from unlabeled data used to train a student model. To illustrate, FIG. 7 shows a block diagram of utilizing a trained text sequence labeling teacher model 708 ("trained teacher model 708") to generate pseudo-text sequence labels 712 in accordance with one or more implementations.

As shown, the trained teacher model 708 includes a first set of learned model parameters 710 and pseudo-text sequence labels 712. In various implementations, the trained teacher model 708 corresponds to the teacher model 108 previously described and the first set of learned model parameters 710 corresponds to the first set of model parameters 610 after being trained at the teacher model 108 (as described with regard to FIG. 6). Indeed, in many implementations, the trained teacher model 708 represents the teacher model 108 after training with the labeled data set 502.

As shown, FIG. 7 includes the training data 500 and the trained teacher model 708. As illustrated, the training data 500 includes the unlabeled data set 508 having the text data 510. In one or more implementations, the text sequence labeling system 106 processes the text data 510 of the unlabeled data set 508 through the trained teacher model 708 to generate (e.g., extract from the input text data) the pseudo-text sequence labels 712 (e.g., pseudo-keyphrases). Upon generating the pseudo-text sequence labels 712 (e.g., pseudo-labels), the text sequence labeling system 106 then pairs the generated pseudo-text sequence labels 712 with the corresponding text data 510, converting the unlabeled data set 508 into a pseudo-labeled data set.

In one or more implementations, the text sequence labels (e.g., the predicted text sequence labels 612, the pseudo-text sequence label 712, or other extracted text sequence labels) include beginning, inside, and outside labels (e.g., BIO labels). For example, for each word provided to a text sequence labeling model from text data, the text sequence labeling model outputs a tag indicating whether the word corresponds to the beginning (or first word) in a keyphrase, the inside (or non-first word) of a keyphrase, or whether the word does not correspond to a keyphrase (e.g., the word is outside the keyphrase). In alternative implementations, the text sequence labeling system 106 utilizes binary labeling or another tagging method to indicate whether a word or term is a keyphrase from text data.

Turning now to FIG. 8, additional detail is provided regarding training the student model 110. In particular, FIG. 8 illustrates a block diagram of training a text sequence labeling student model 110 ("student model 110") in accordance with one or more implementations. As shown, FIG. 8 includes the training data 500, a data sampling manager 802, predicted text sequence labels 804, the teacher model 108, predicted text sequence labels 804, and a text sequence labeling loss model 614.

In one or more implementations, the text sequence labeling system 106 creates the student model 110 from the trained teacher model 708. For example, the text sequence labeling system 106 generates a machine-learning model with the same architecture as the teacher model 108. For example, as mentioned above with respect to FIG. 4, in various implementations the student model 110 includes a Bi-LSTM model, a transformer-based encoder, and/or a CRF.

Further, in one or more implementations, the text sequence labeling system 106 initializes the student model 110 with the first set of learned model parameters 710 as shown. For example, the text sequence labeling system 106 exports the first set of learned model parameters 710 from the trained teacher model 708 and imports or loads the first set of learned model parameters 710 into the student model 110.

As described above, in one or more implementations, the text sequence labeling system 106 utilizes the training data 500 to train the student model 110. As shown in FIG. 8, the text sequence labeling system 106 accesses the training data 500, which includes the labeled data set 502 having the text data 504 and corresponding text sequence labels 506 as well as the unlabeled data set 508 having the text data 510 and corresponding pseudo-text sequence labels 512. As described above, the unlabeled data set 508 includes the pseudo-text sequence labels 512 extracted by the trained teacher model 708.

As also described above, in various implementations, the text sequence labeling system 106 utilizes both labeled training data as well as unlabeled or pseudo-labeled training data to train the student model 110. To illustrate, in one or more implementations, the text sequence labeling system 106 processes input data received from the text data 504 from the labeled data set 502 as well as the text data 510 from the unlabeled data set 508.

In various implementations, the text sequence labeling system 106 utilizes the data sampling manager 802 to sample batches of text data from both the labeled data set 502 and the unlabeled data set 508. For example, in some implementations, the data sampling manager 802 randomly and uniformly samples a batch of labeled documents (i.e., the text data 504). Further, the data sampling manager 802 randomly and uniformly samples a batch of unlabeled documents (i.e., the text data 510).

In many implementations, the text sequence labeling system 106 retrieves a greater number of samples from the unlabeled data set 508 than from the labeled data set 502. For example, the text sequence labeling system 106 samples x times (e.g., 4×, 8×, 16×, etc.) more samples of unlabeled data than labeled data. In this manner, in one or more implementations, the text sequence labeling system 106 efficiently leverages the larger unlabeled data set 508. Additionally, utilizing more text data from the unlabeled data set 508 causes the text sequence labeling system 106 to favor self-distillation when training of the student model 110 (e.g., training from the model's own output). However, by also utilizing a portion of the labeled data set 502, the text sequence labeling system 106 ensures that the student model 110 does not being to stray from the supervised ground truth.

As shown, the data sampling manager 802 provides the sampled input data to the student model 110, which processes the input data utilizing the first set of learned model parameters 710. As with the teacher model 108 described above, the student model 110 encodes the input data, processes the encoded data through upper neural network layers of the student model 110, and decodes the processed data. Further, the student model 110 extracts and outputs predicted text sequence labels 804 corresponding to the input data.

In one or more implementations, during training, the text sequence labeling system 106 provides the predicted text sequence labels 804 to the text sequence labeling loss model 614, which was introduced above in connection with FIG. 6. In various embodiments, the text sequence labeling loss model 614 compares the predicted text sequence labels 804 to corresponding ground truth text sequence labels to determine a loss metric (e.g., a label prediction loss).

As shown, the text sequence labeling loss model 614 receives ground truth text sequence labels (e.g., the text data 504 from the labeled data set 502 and the pseudo-text sequence labels 512 from the unlabeled data set 508). For example, for predicted text sequence labels 804 extracted from text data 504 from the labeled data set 502, the text sequence labeling loss model 614 utilizes corresponding text sequence labels 506 as the ground truth to measure label prediction loss. Additionally, for predicted text sequence labels 804 generated from text data 510 from the unlabeled data set 508, the text sequence labeling loss model 614 utilizes corresponding pseudo-text sequence labels 512 as the ground truth to measure label prediction loss. In various implementations, when the data sampling manager 802 samples text data from the labeled data set 502 and the unlabeled data set 508 to provide to the student model 110, the data sampling manager 802 also provides corresponding text sequence labels to the text sequence labeling loss model 614.

In one or more implementations, the text sequence labeling system 106 aggregates the label prediction loss to determine a total label prediction loss. Further, the text sequence labeling system 106 tunes and trains the student model 110 by backpropagating the label prediction loss to the parameters of the student model 110. As shown, the text sequence labeling system 106 trains the student model 110 to learn a second set of learned model parameters 810 based on the label prediction loss.

Figure 9:
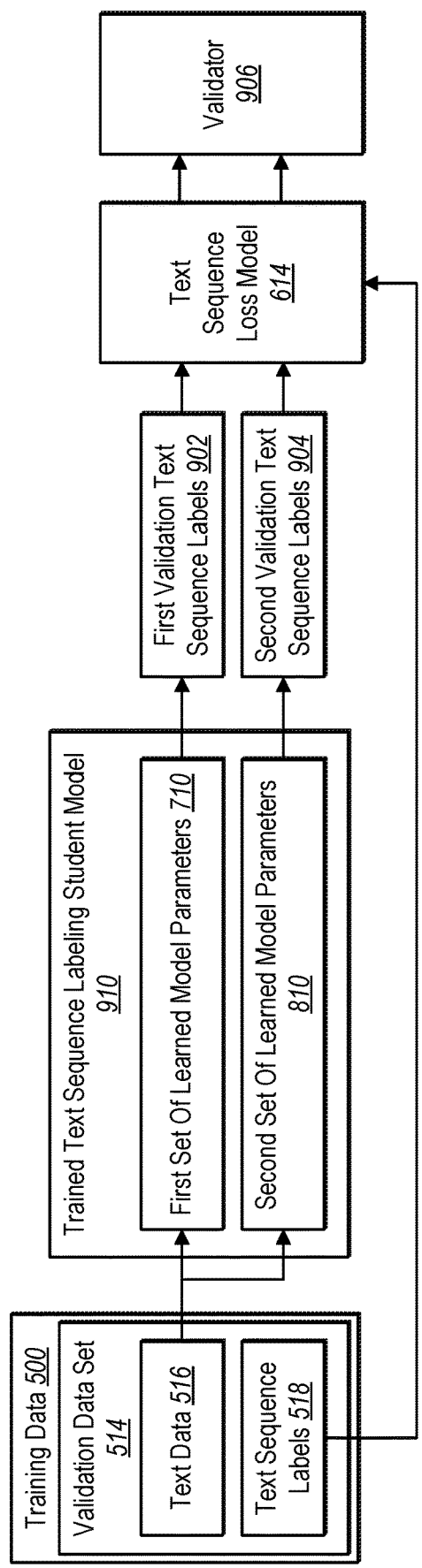
FIG. 9 illustrates a block diagram of validating a trained text sequence labeling student model in accordance with one or more implementations.

In one or more implementations, upon training the student model 110, the text sequence labeling system 106 determines if the student model 110 is improved over the trained teacher model 708. To illustrate, FIG. 9 shows a block diagram of validating the trained text sequence labeling student model 910 ("trained student model 910") in accordance with one or more implementations. As shown, FIG. 9 includes the training data 500, a trained student model 910, first validation text sequence labels 902, second validation text sequence labels 904, the text sequence labeling loss model 614, and a validator 906.

As described above, in various implementations, the text sequence labeling system 106 performs validation to compare two machine-learning models and/or sets of learned model parameters. Accordingly, as illustrated in FIG. 9, the training data 500 includes the validation data set 514 having text data 516 and corresponding text sequence labels 518. In one or more implementations, the validation data set 514 is part of a labeled data set that the text sequence labeling system 106 separates to perform validation, as described above.

In one or more implementations, the text sequence labeling system 106 processes the text data 516 utilizing the trained student model 910. In some implementations, the trained student model 910 processes the text data 516 utilizing the first set of learned model parameters 710 to generate the first validation text sequence labels 902. Additionally, the trained student model 910 processes the text data 516 utilizing the second set of learned model parameters 810 to generate the second validation text sequence labels 904.

In alternative implementations, the text sequence labeling system 106 utilizes the trained teacher model 708 (or another text sequence labeling model) to process validation data utilizing the first set of learned model parameters 710 to generate the first validation text sequence labels 902. Further, in one or more implementations, the text sequence labeling system 106 generates the first validation text sequence labels 902 and the second validation text sequence labels 904 with the same portion of the validation data set 514. In some implementations, the text sequence labeling system 106 generates the first validation text sequence labels 902 and the second validation text sequence labels 904 with different portions of the validation data set 514 and/or at different training iterations (e.g., from adjacent/sequential training iterations).

Upon generating the validation text sequence labels, the text sequence labeling system 106 determines whether the second set of learned model parameters 810 outperforms the first set of learned model parameters 710. For example, in various implementations, the text sequence labeling system 106 utilizes the text sequence labeling loss model 614 to determine a first loss metric for the first validation text sequence labels 902 and a second loss metric for the second validation text sequence labels 904.

In one or more implementations, the validator 906 compares the first loss metric and the second loss metric. For example, in some implementations, the validator 906 determines that the second loss metric is smaller than the first loss metric, which indicates that the second set of learned model parameters 810 outperforms the first set of learned model parameters 710 (e.g., the second set of learned model parameters 810 generates an improved validation output). Indeed, the validator 906 determines that the second set of learned model parameters 810 resulted in more correct text sequence labels 518 for the text data 516 than the first set of learned model parameters 710. In some implementations, the text sequence labeling system 106 determines that the second set of learned model parameters 810 generates an improved validation output when the difference between the loss metrics satisfies an improvement threshold (e.g., at least 5% or 10% improvement).

In various implementations, the text sequence labeling system 106 determines that the second set of learned model parameters 810 generates an improved validation output without utilizing the text sequence labeling loss model 614. For example, the validator 906 tallies the number of validated text sequence labels that match the text sequence labels 518. If the second set of learned model parameters 810 produces more correct matches, then the text sequence labeling system 106 determines that the second set of learned model parameters 810 generates an improved validation output.

In example implementations, the text sequence labeling system 106 performs a validation check at each training iteration. In some implementations, the text sequence labeling system 106 validates the output of the trained student model 910 (e.g., the second set of learned model parameters 810) after multiple training iterations (e.g., 2, 5, 10, etc.).

In some implementations, the text sequence labeling system 106 determines that the second set of learned model parameters 810 does not generate an improved validation output. In these implementations, the text sequence labeling system 106 continues to train the student model 110, as described above, for one or more additional iterations before re-validating. In additional or alternative implementations, the text sequence labeling system 106 re-initializes the student model 110 back to the first set of learned model parameters 710 and re-trains the student model 110, as described above.

In many implementations, upon determining that the second set of learned model parameters 810 generates an improved validation, the text sequence labeling system 106 re-initializes the teacher model 108 (e.g., the trained teacher model 708) with the second set of learned model parameters 810, as described above. Indeed, in these implementations, the text sequence labeling system 106 utilizes the updated trained teacher model 708 to process text data from an unlabeled data set to generate an additional set of pseudo-text sequence labels, then utilizes the additional set of pseudo-text sequence labels to train the student model 110 to learn a third (or additional) set of learned model parameters, as described above. If the third (or additional) set of learned model parameters outperform the second (or current) set of learned model parameters at the trained teacher model 708, the text sequence labeling system 106 overwrites the model parameters at the trained teacher model 708 and again repeats the iterative joint-learning self-distillation framework, as described above.

As mentioned above, the text sequence labeling system 106 often repeats the actions of generating pseudo-text sequence labels from an unlabeled data set. In one or more implementations, across multiple training iterations, the text sequence labeling system 106 processes the same portion of text data from the unlabeled data set to generate pseudo-text sequence labels. Because the learned model parameters change between iterations, the trained teacher model 708 would generate different, more accurate, pseudo-text sequence labels from the same input data. In some implementations, the text sequence labeling system 106 utilizes the same unlabeled data set but different portions of data. In various implementations, the text sequence labeling system 106 utilizes different unlabeled data set at different joint-learning iterations.

As also mentioned above, the text sequence labeling system 106 repeats the iterative joint-learning iteration of replacing the teacher model with an improved student model, then utilizing the replaced teacher model to further improve the student model. In various implementations, the text sequence labeling system 106 continues to repeat these actions for a set number of iterations or until one or more training conditions are met (e.g., 25, 50, 100, 125 training epochs).

In one or more implementations, training conditions are met after a set number of iterations and/or a set amount of time. In some implementations, training conditions are met when the accuracy of a trained text sequence labeling model satisfies a training accuracy threshold (e.g., 95% accurate when evaluating a testing data set). Further, in various implementations, training conditions are met when the overall improvement of the set of learned model parameter satisfies a training improvement threshold. In alternative implementations, the text sequence labeling system 106 utilizes other training conditions to determine when to stop jointly training the text sequence labeling models.

The foregoing figures describe example implementations of jointly training a text sequence labeling teacher model and a text sequence labeling student model in an iterative manner. Listing 1, shown below, illustrates a sample algorithm of implementing the text sequence labeling system 106 to extract keyphrases from documents. Indeed, Listing 1 shows an example implementation of the text sequence labeling system 106 implementing the jointly-learning self-distillation (JLSD) framework described herein.

Listing 1

Input:
Labeled documents $\{(D_1, y_1), \ldots (D_n, y_n)\}$
Unlabeled documents $\{\widetilde{D_1}, \widetilde{D_2}, \ldots, \widetilde{D_m}\}$.
Function (Joint-Learning based on Self-Distillation):
Train a teacher model using the labeled documents.
Initialize a student model with the same architecture and model parameters as the trained teacher model.
for i = 1 . . . T do
   Sample a batch of labeled documents L uniformly at random.
   Sample a batch of unlabeled documents U = $\{\widetilde{D_{t1}}, \widetilde{D_{t2}}, \ldots, \widetilde{D_{tk}}\}$ uniformly at random, where (k = r|L|).
   Use the trained teacher model to generate (hard) pseudo-text sequence labels for Ũ to get U = $\{(\widetilde{D_{t1}}, y_{i1}), (\widetilde{D_{t2}}, y_{i2}) \ldots, (\widetilde{D_{tk}}, y_{ik})\}$.
   Use gradient descent to train and update the model parameters of the student model using the text data and text sequence label in L ∪ U.

Listing 1
-continued

If (performance of the student model yields an improvement), then
     re-initialize the teacher model using the student model.
end As shown, the input in Listing 1 includes label documents (i.e., a labeled data set) that include n number of documents (e.g., D) and corresponding text sequence labels (y). In addition, the input in Listing 1 also includes unlabeled documents (i.e., an unlabeled data set) that includes m numbers of unlabeled documents (e.g., D̃).

In addition, Listing 1 includes the term T, which refers to a number of training iterations. Also, Listing 1 includes the term L, which refers to a number of labeled documents sampled. Further, Listing 1 includes the term r, which refers to a hyperparameter for determining the number of unlabeled documents to be sampled in each iteration (e.g., r=0.25, 0.5, 1.0, 1.5, 2, 4, etc.). Accordingly, the term k refers to the total number of unlabeled documents to sample at each iteration, which is a multiple of the number of labeled documents sampled (e.g., L).

Figure 10:
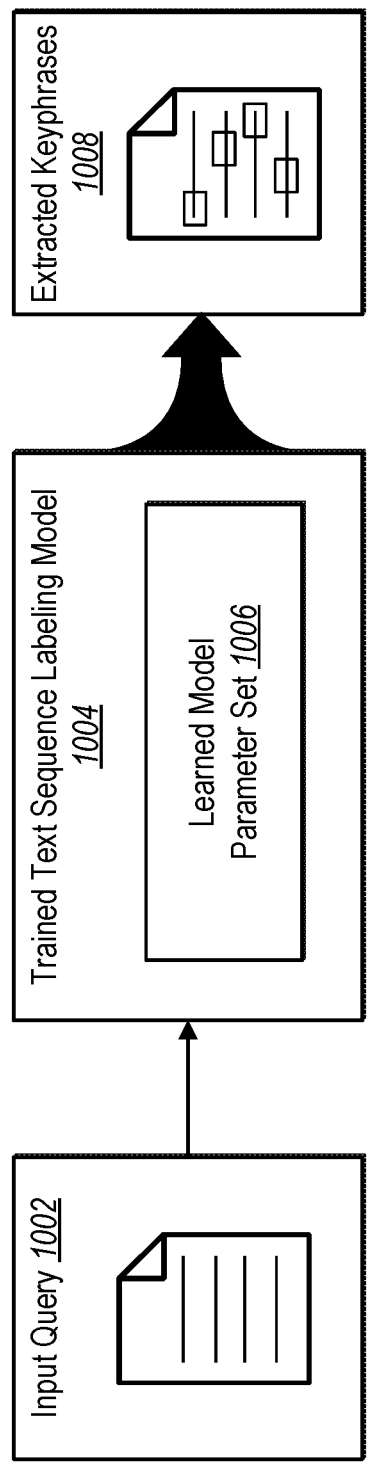
FIG. 10 illustrates a block diagram of utilizing a trained text sequence labeling model to generate text sequence labels from an input document in accordance with one or more implementations.

Turning now to FIG. 10, additional details are provided with respect to implementing a trained text sequence labeling model. In particular, FIG. 10 illustrates a block diagram of utilizing a trained text sequence labeling model 1004 to generate text sequence labels from an input document in accordance with one or more implementations. As shown, FIG. 10 shows an input query 1002, a trained text sequence labeling model 1004 having a set of learned model parameters 1006, and extracted keyphrases 1008 (i.e., text sequence labels).

In one or more implementations, the trained text sequence labeling model 1004 corresponds to the last iteration of a trained student model. In some implementations, the trained text sequence labeling model 1004 corresponds to a trained teacher model that has been initialized with the most recently updated set of learned model parameters (e.g. the set of learned model parameters 1006). In alternative implementations, the trained text sequence labeling model 1004 is another text sequence labeling model that is initialized with the set of learned model parameters 1006.

In one or more implementations, the text sequence labeling system 106 receives an input query 1002. For example, a user on a client device provides an unlabeled document as part of the input query 1002 to the text sequence labeling system 106. In response, the text sequence labeling system 106 processes the unlabeled document utilizing the trained text sequence labeling model 1004 and the set of learned model parameters 1006 to extracted keyphrases from the unlabeled document, shown as the extracted keyphrases 1008.

Further, the text sequence labeling system 106 provides the extracted keyphrases 1008 to the user in response to the input query 1002. In some implementations, the text sequence labeling system 106 incorporates the extracted keyphrases 1008 into the input document as part of returning the extracted keyphrases 1008 (e.g., the text sequence labeling system 106 highlights the extracted keyphrases 1008 within the input document). In some implementations, the text sequence labeling system 106 returns the extracted keyphrases 1008 as a separate list of keyphrases.

As mentioned above, the text sequence labeling system 106 empirically outperforms conventional systems, including state-of-the-art systems. To evaluate the performance of the text sequence labeling system 106, researchers compared implementations of the text sequence labeling system 106 to state-of-the-art systems including both supervised and unsupervised models. As shown below in Table 1, the text sequence labeling system 106 outperforms the state-of-the-art systems in both model accuracy and efficiency.

To illustrate, the researchers evaluated the text sequence labeling system 106 with respect to two labeled data sets of documents (i.e., Inspec and SemEval-2017) and one larger unlabeled data set (i.e., KP20k). For example, the researchers randomly divided the data sets into a training subset, a validation subset, and a testing subset (e.g., split 1000/500/500) and used these data sets to separately train different versions of the models being compared.

For the evaluations, the researchers first created two baseline text sequence labeling models utilizing the architecture described above with respect to FIG. 4. These baseline models differ from the state-of-the-art systems. The researchers trained the two baseline models with different pre-trained contextual embeddings, including 1) bidirectional encoder representations from transformers (BERT) and 2) BERT in the scientific domain (SciBERT). In addition to these baseline models, the researchers generated text sequence labeling models that implemented the joint-learning self-distillation (JLSD) framework described herein on top of the contextual embeddings (e.g., BERT (JLSD) and SciBERT (JLSD)).

The researchers tested the baseline text sequence labeling models and JLSD-improved text sequence labeling models against state-of-the-art systems with respect to the two data sets mentioned above. As shown in Table 1 below, the two baseline models that follow the architecture disclosed herein are indicated as BERT (Baseline) and SciBERT (Baseline) and the improved models are indicated as BERT (JLSD) and SciBERT (JLSD). As also shown in Table 1 below, the state-of-the-art models include ELMo, RoBERTA, BERT (Sahrawat), and SciBERT (Sahrawat). For context, results for the state-of-the-art models were obtained from Sahrawat D. et al., Keyphrase Extraction As Sequence Labeling Using Contextualized Embeddings, published in the European Conference on Information Retrieval (pages 328-335) in 2020.

As also shown in Table 1 below, the researchers compared F1 scores. For context, the F1 score is a common evaluation metric that indicates a weighted average of the precision and recall of the model (e.g., the model accuracy). F1 scores range from 0-1, 0 being the poorest score and 1 being the best score. Further, when calculating the F1 scores, only extracted keyphrases present in the input documents were considered. Additionally, results from the baseline and improved text sequence labeling models were averaged over three random seeds.

TABLE 1

| Models | F1 Scores | |
|---|---|---|
| | Data Set 1 | Data Set 2 |
| ELMO | 0.568 | 0.504 |
| RoBERTA | 0.595 | 0.508 |
| BERT (Sahrawat) | 0.591 | 0.522 |
| SciBERT (Sahrawat) | 0.593 | 0.521 |
| SciBERT (Baseline) | 0.598 | 0.544 |
| SciBERT (JLSD) | 0.605 | 0.546 |
| BERT (Baseline) | 0.596 | 0.537 |
| BERT (JLSD) | 0.601 | 0.554 |

As shown in Table 1, adding the joint-learning self-distillation framework of the text sequence labeling system 106 resulted in significant improvements. Indeed, researchers found that the joint-learning self-distillation framework of the text sequence labeling system 106 achieved new state-of-the-art benchmarks with respect to the two data sets tested.

As mentioned above, the researchers evaluated the text sequence labeling system 106 against state-of-the-art unsupervised models. In each case, the text sequence labeling models of the text sequence labeling system 106 greatly outperformed the unsupervised models. Indeed, with respect to both supervised and unsupervised state-of-the-art models, the text sequence labeling system 106 achieved greater accuracy and efficiency.

Figure 11:
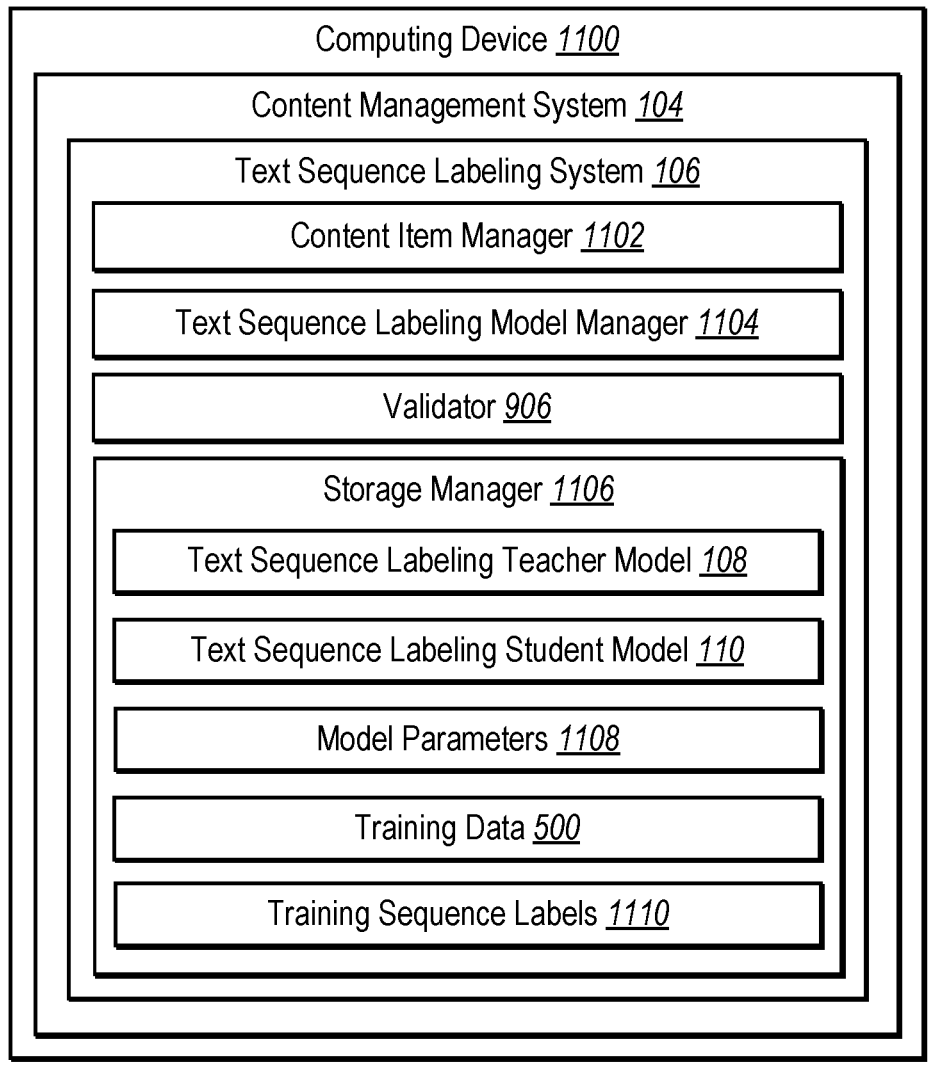
FIG. 11 illustrates a schematic diagram of the text sequence labeling system in accordance with one or more implementations.

Referring now to FIG. 11, additional detail is provided regarding the capabilities and components of a text sequence labeling system 106 in accordance with one or more implementations. In particular, FIG. 11 shows a schematic diagram of an example architecture of the text sequence labeling system 106 implemented within a content management system 104 and hosted on a computing device 1100.

In addition, the computing device 1100 may represent various types of computing devices (e.g., the server device 102 and/or the client device 112). For example, in one or more implementations, the computing device 1100 is a mobile computing device, such as a laptop, a tablet, a mobile telephone, a smartphone, a wearable device, or a device connected to the internet. In some implementations, the computing device 1100 is a non-mobile computing device, such as a server, a cluster of servers, a desktop, or another type of non-mobile computing device. Additional details with regard to the computing device 1100 are discussed below with respect to FIG. 13.

As shown, the computing device 1100 includes the content management system 104, which is described above, and the text sequence labeling system 106. The text sequence labeling system 106 includes various components for performing the processes and features described herein. To illustrate, the text sequence labeling system 106 includes a content item manager 1102, a text sequence labeling model manager 1104, a validator 906, and a storage manager 1106. As shown, the storage manager 1106 includes a text sequence labeling teacher model 108, a text sequence labeling student model 110, model parameters 1108, the training data 500, and text sequence labels 1110.

As mentioned above, the text sequence labeling system 106 includes the content item manager 1102. In various embodiments, the content item manager 1102 facilitates the retrieval, identification, access, modification, removal, deletion, transmission, and/or storage of content items, such as digital documents. In some implementations, the content item manager 1102 stores and retrieves digital documents from the storage manager 1106. For example, the content item manager 1102 accesses and provides content items from the training data 500 to components of the text sequence labeling system 106. As another example, the content item manager 1102 enables a user to provide a query input including an unlabeled document for the text sequence labeling system 106 to generate text sequence labels 1110 as well as returns the generated text sequence labels 1110 (e.g., extracted keyphrases) to the user in response to the query.

As shown, the text sequence labeling system 106 includes the text sequence labeling model manager 1104. In various implementations, the text sequence labeling model manager 1104 facilitates the creation, generation, initiation, training, tuning, modification, deletion, transmission, and/or storage of machine-learning models and portions of machine-learning models (e.g., model parameters 1108). For example, the text sequence labeling model manager 1104 obtains assists in the joint-learning of the text sequence labeling teacher model 108 ("teacher model 108") with the text sequence labeling student model 110 ("student model 110"). In some implementations, the text sequence labeling model manager 1104 facilitates exporting and importing model parameters 1108 including a set of learned model parameters between the teacher model 108 and the student model 110, as described above.

As shown, the text sequence labeling system 106 includes the validator 906. In one or more implementations, the validator 906 determines the differences between machine-learning models and/or different model parameters 1108. In some implementations, the validator 906 determines that the learned model parameters at the student model 110 generate an improved validation output over learned model parameters at the teacher model 108, as described above.

As shown, the text sequence labeling system 106 includes the storage manager 1106. As mentioned, the storage manager 1106 includes the text sequence labeling teacher model 108, the text sequence labeling student model 110, the model parameters 1108 (including learned model parameters), the training data 500, and the text sequence labels 1110.

Each of the components of the text sequence labeling system 106 may include software, hardware, or both. For example, the components may include one or more instructions stored on a computer-readable storage medium and executable by processors of one or more computing devices, such as a client device (e.g., a mobile client device) or server device. When executed by the processors, the computer-executable instructions of the text sequence labeling system 106 may cause a computing device to perform the feature learning methods described herein. Alternatively, the components may include hardware, such as a special-purpose processing device to perform a certain function or group of functions. In addition, the components of the text sequence labeling system 106 may include a combination of computer-executable instructions and hardware.

Furthermore, the components of the text sequence labeling system 106 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE® EXPERIENCE CLOUD, CREATIVE CLOUD®, ADOBE® DOCUMENT CLOUD®, ADOBE® ANALYTICS CLOUD, or other digital content applications software packages. The foregoing are either registered trademarks or trademarks of Adobe Inc. in the United States and/or other countries.

FIGS. 1-11, the corresponding text, and the examples provide several different methods, systems, devices, and non-transitory computer-readable media of the text sequence labeling system 106. In addition to the foregoing, one or more implementations may also be described in terms of flowcharts comprising acts for accomplishing a particular result, such as the flowcharts of acts shown in FIG. 12. Additionally, the acts described herein may be repeated or performed in parallel with one another or parallel with different instances of the same or similar acts.

Figure 12:
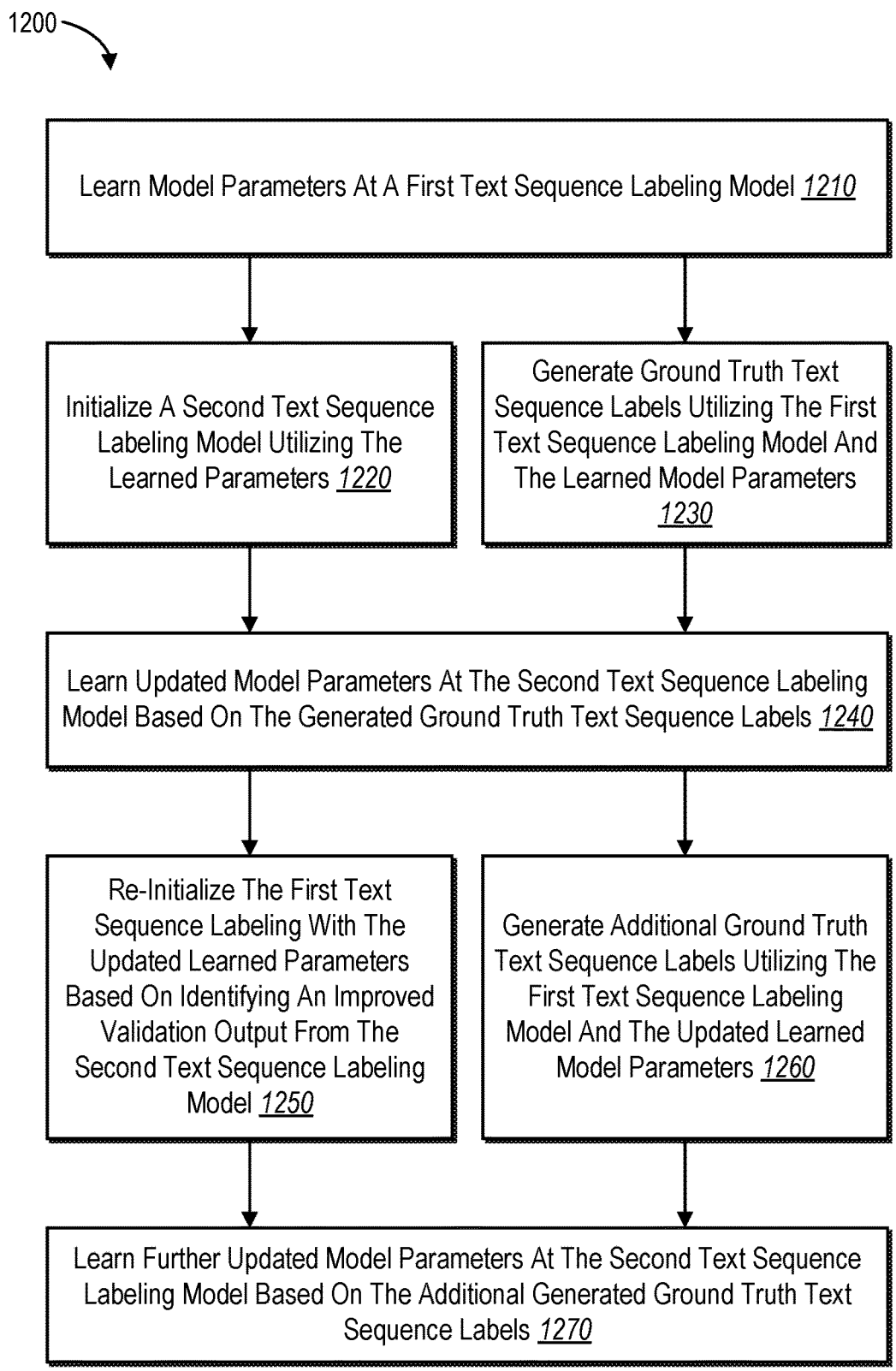
FIG. 12 illustrates a flowchart of a series of acts of utilizing machine-learning models to generate text sequence labels from unlabeled text in accordance with one or more implementations.

As mentioned previously, FIG. 12 illustrates a flowchart of a series of acts 1200 of utilizing machine-learning models to generate text sequence labels (e.g., extracted keyphrases) from unlabeled text in accordance with one or more implementations. While FIG. 12 illustrates acts according to one implementation, alternative implementations may omit, add to, reorder, and/or modify any of the acts shown in FIG. 12. The acts of FIG. 12 may be performed as part of a method. Alternatively, a non-transitory computer-readable medium may comprise instructions that, when executed by one or more processors, cause a computing device to perform the acts of FIG. 12. In some implementations, a system may perform the acts of FIG. 12.

In one or more implementations, the series of acts 1200 is implemented on one or more computing devices, such as the server device 102, the client device 112, or the computing device 1100. In addition, in some implementations, the series of acts 1200 is implemented in a digital medium environment for continuously updating online machine-learning models. For example, the series of acts 1200 is implemented on a computing device having memory that includes a first text data set having a first set of ground truth text sequence labels and a second text data set.

The series of acts 1200 includes an act 1210 of learning model parameters at a first text sequence labeling model. In particular, the act 1210 may involve learning a first set of model parameters of a first text sequence labeling machine-learning model utilizing the first text data set and the first set of ground truth text sequence labels. In some implementations, the act 1210 includes learning the first set of model parameters of the first text sequence labeling machine-learning model utilizing a labeled text data set and a labeled set of ground truth text sequence labels corresponding to the labeled text data set.

As shown, the series of acts 1200 also includes an act 1220 of initializing a second text sequence labeling model utilizing the learned parameters. In particular, the act 1220 may involve utilizing a first set of learned model parameters of a first text sequence labeling machine-learning model to initialize a second text sequence labeling machine-learning model. In some implementations, the act 1220 includes copying the first set of learned model parameters from the first text sequence labeling model (e.g., a teacher model) to the second text sequence labeling model (e.g., a student model).

As shown, the series of acts 1200 also includes an act 1230 of generating ground truth text sequence labels utilizing the first text sequence labeling model and the learned model parameters. In particular, the act 1230 may involve generating a set of ground truth text sequence labels for a text data set utilizing the first set of model parameters of the first text sequence labeling machine-learning model. In one or more implementations, the act 1230 includes generating the set of ground truth text sequence labels for the text data set by determining beginning, inside, and outside labels for the second text data set.

As shown, the series of acts 1200 also includes an act 1240 of learning updated model parameters at the second text sequence labeling model based on the generated ground truth text sequence labels. In particular, the act 1240 may involve learning a second set of model parameters of the second text sequence labeling machine-learning model utilizing the text data set and the set of ground truth text sequence labels. In one or more implementations, the act 1240 includes learning the second set of model parameters of the second text sequence labeling machine-learning model by generating a predicted set of text sequence labels by processing the text data set utilizing the second text sequence labeling machine-learning model initialized with the first set of model parameters, comparing the predicted set of text sequence labels to the set of ground truth text sequence labels; and tuning the second text sequence labeling machine-learning model from the first set of model parameters to the second set of learned model parameters based on the comparison.

In some implementations, the act 1240 includes learning the second set of learned model parameters of the second text sequence labeling machine-learning model further utilizing the labeled text data set and the labeled set of ground truth text sequence labels. In example implementations, the act 1240 includes selecting a first number of text samples from the first text data set (e.g., a labeled data set), selecting a second number of text samples from the second text data set (e.g., an unlabeled data set), and processing the first number of text samples and the second number of text samples to learn the second set of model parameters. In one or more implementations, the second number is greater than the second number.

In various implementations, the act 1240 includes learning a second set of model parameters of the second text sequence labeling machine-learning model by generating encoded tokens utilizing a transformer-based encoder from the first text data set, determining hidden state vectors from the encoded tokens utilizing a bidirectional long short term memory network, mapping the hidden state vectors to a text sequence label space utilizing a dense layer, and decoding the mapped vectors into text sequence labels utilizing a linear-chain conditional random field.

In example implementations, the act 1240 includes the acts of generating a predicted set of text sequence labels by processing the text data set utilizing the second text sequence labeling machine-learning model initialized with the first set of model parameters, determining a loss metric by comparing the set of text sequence labels to the set of ground truth text sequence labels, and tuning the second text sequence labeling machine-learning model from the first set of learned model parameters to the second set of learned model parameters based on the loss metric.

As shown, the series of acts 1200 also includes an act 1250 of re-initializing the first text sequence labeling with the updated learned parameters based on identifying an improved validation output from the second text sequence labeling model. In particular, the act 1250 may involve re-initializing the first text sequence labeling machine-learning model with the second set of learned model parameters based on identifying an improved validation output from the second text sequence labeling machine-learning model.

In one or more implementations, the act 1250 includes identifying the improved validation output from the second text sequence labeling machine-learning model based on generating a first validation output by processing a validation data set utilizing the first set of model parameters, generating a second validation output by processing the validation data set utilizing the second set of learned model parameters, and comparing the first validation output and the second validation output. In some implementations, the act 1250 includes generating a first validation output by processing a validation data set utilizing the first set of model parameters and applying a loss function, generating a second validation output by processing the validation data set utilizing the second set of learned model parameters and applying the loss function, and comparing the first validation output and the second validation output.

As shown, the series of acts 1200 also includes an act 1260 of generating additional ground truth text sequence labels utilizing the first text sequence labeling model and the updated learned model parameters. In particular, the act 1260 may involve generating, upon re-initializing the first text sequence labeling machine-learning model, an additional set of ground truth text sequence labels for one or more text data sets utilizing the second set of learned model parameters of the first text sequence labeling machine-learning model.

As shown, the series of acts 1200 also includes an act 1270 of learning further updated model parameters at the second text sequence labeling model based on the additional generated ground truth text sequence labels. In particular, the act 1270 may involve learning a third set of model parameters of the second text sequence labeling machine learning model utilizing one or more text data sets and an additional set of ground truth text sequence labels generated utilizing the second set of learned model parameters of the text first sequence labeling machine-learning model. In one or more implementations, the act 1270 also includes re-initializing the first text sequence labeling machine-learning model with the third set of learned model parameters based on identifying a subsequently improved validation output from the second text sequence labeling machine-learning model. In some implementations, the act 1270 includes processing a validation data set utilizing the second set of learned model parameters and the third set of model parameters.

The series of acts 1200 may include various additional acts. For example, the series of acts 1200 may include acts of receiving a query including a document, generating one or more text sequence labels for the document utilizing the second set of learned model parameters, providing the one or more text sequence labels in response to the query, and/or associating the one or more text sequence labels with the document.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the text sequence labeling system to jointly train text sequence labeling models utilizing a self-distillation framework, as described herein.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

The computer-readable media may be any available media that is accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure may comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media may include a network and/or data links that are used to carry desired program code means in the form of computer-executable instructions or data structures and that are accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 13:
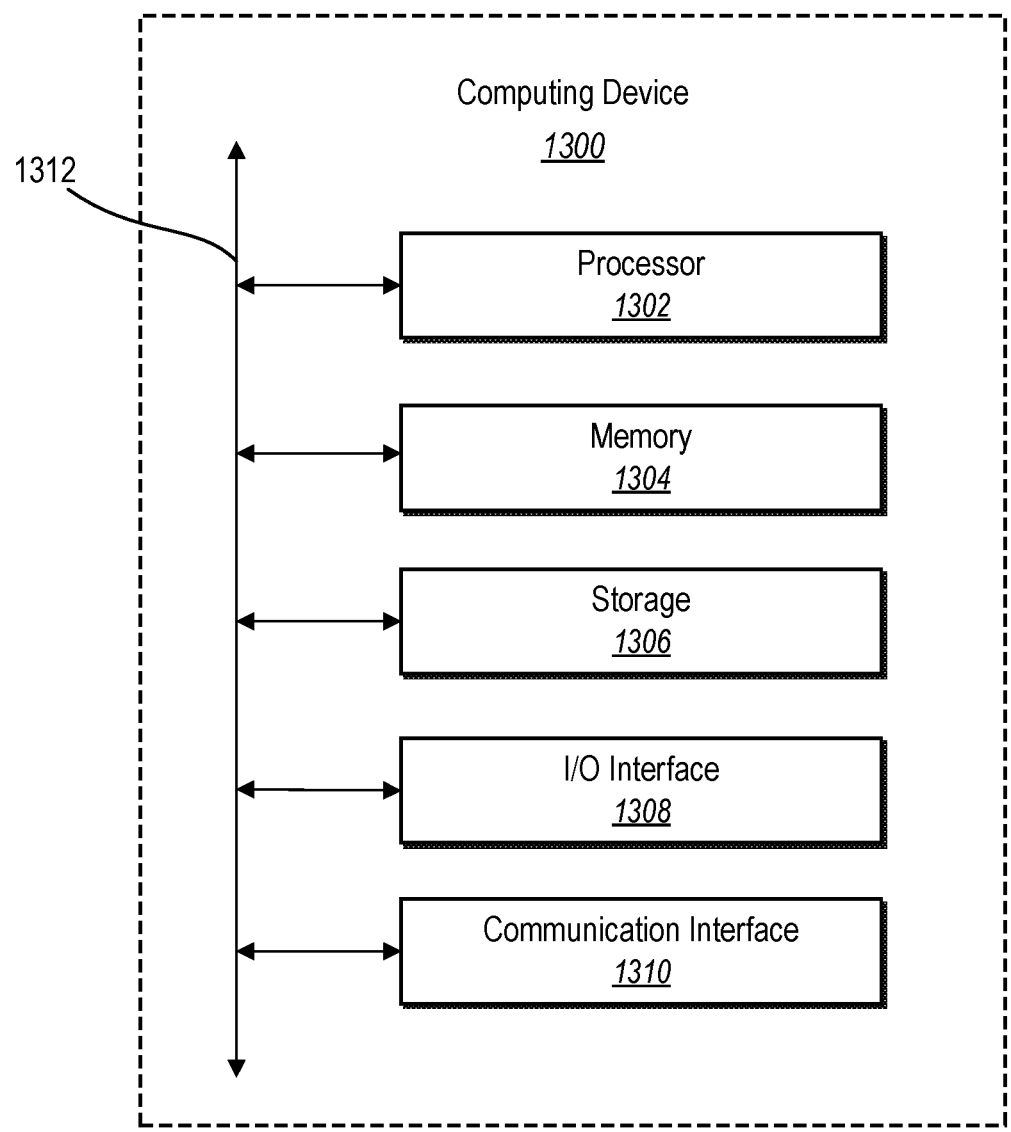
FIG. 13 illustrates a block diagram of an example computing device for implementing one or more implementations of the present disclosure.

FIG. 13 illustrates a block diagram of an example computing device 1300 that may be configured to perform one or more of the processes described above. One will appreciate that one or more computing devices, such as the server device 102, the client device 112, or the computing device 1100. In one or more implementations, the computing device 1300 may be a non-mobile device (e.g., a desktop computer, a server device, a web server, a file server, a social networking system, a program server, an application store, or a content provider). Further, the computing device 1300 may be a server device that includes cloud-based processing and storage capabilities. In some implementations, the computing device 1300 may be a mobile device (e.g., a laptop, a tablet, a smartphone, a mobile telephone, a camera, a tracker, a watch, a wearable device, etc.).

As shown in FIG. 13, the computing device 1300 can include one or more processor(s) 1302, memory 1304, a storage device 1306, input/output ("I/O") interfaces 1308, and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other implementations. Furthermore, in certain implementations, the computing device 1300 includes fewer components than those shown in FIG. 13. Components of the computing device 1300 shown in FIG. 13 will now be described in additional detail.

In particular implementations, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes a storage device 1306 includes storage for storing data or instructions. As an example, and not by way of limitation, the storage device 1306 can include a non-transitory storage medium described above. The storage device 1306 may include a hard disk drive (HDD), flash memory, a Universal Serial Bus (USB) drive, or a combination of these or other storage devices.

As shown, the computing device 1300 includes one or more I/O interfaces 1308, which are provided to allow a user to provide input to (e.g., user strokes), receive output from, and otherwise transfer data to and from the computing device 1300. These I/O interfaces 1308 may include a mouse, keypad or a keyboard, a touch screen, camera, optical scanner, network interface, modem, other known I/O devices, or a combination of these I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI. The computing device 1300 can further include a bus 1312. The bus 1312 can include hardware, software, or both that connects components of computing device 1300 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a computer system to:
    utilize a first set of learned model parameters of a first text sequence labeling machine-learning model to initialize a second text sequence labeling machine-learning model;
    generate a set of ground truth text sequence labels for a text data set utilizing the first set of learned model parameters of the first text sequence labeling machine-learning model;
    learn a second set of model parameters of the second text sequence labeling machine-learning model utilizing the text data set and the set of ground truth text sequence labels; and
    based on identifying an improved validation output from the second text sequence labeling machine-learning model, re-initialize the first text sequence labeling machine-learning model with the second set of learned model parameters.

2. The non-transitory computer-readable medium of claim 1, further comprising instructions that, when executed by the at least one processor, cause the computer system to generate, upon re-initializing the first text sequence labeling machine-learning model, an additional set of ground truth text sequence labels for one or more text data sets utilizing the second set of learned model parameters of the first text sequence labeling machine-learning model.

3. The non-transitory computer-readable medium of claim 2, further comprising instructions that, when executed by the at least one processor, cause the computer system to learn a third set of model parameters of the second text sequence labeling machine-learning model utilizing the one or more text data sets and the additional set of ground truth text sequence labels generated utilizing the second set of learned model parameters of the first text sequence labeling machine-learning model.

4. The non-transitory computer-readable medium of claim 3, further comprising instructions that, when executed by the at least one processor, cause the computer system to re-initialize the first text sequence labeling machine-learning model with the third set of learned model parameters based on identifying a subsequently improved validation output from the second text sequence labeling machine-learning model.

5. The non-transitory computer-readable medium of claim 1, further comprising instructions that, when executed by the at least one processor, cause the computer system to identify the improved validation output from the second text sequence labeling machine-learning model based on:

generating a first validation output by processing a validation data set utilizing the first set of learned model parameters;

generating a second validation output by processing the validation data set utilizing the second set of learned model parameters; and comparing the first validation output and the second validation output.

6. The non-transitory computer-readable medium of claim 1, further comprising instructions that, when executed by the at least one processor, cause the computer system to learn the second set of model parameters of the second text sequence labeling machine-learning model by:

generating a predicted set of text sequence labels by processing the text data set utilizing the second text sequence labeling machine-learning model initialized with the first set of learned model parameters;

comparing the predicted set of text sequence labels to the set of ground truth text sequence labels; and based on the comparison, tuning the second text sequence labeling machine-learning model from the first set of learned model parameters to the second set of learned model parameters.

7. The non-transitory computer-readable medium of claim 1, further comprising instructions that, when executed by the at least one processor, cause the computer system to:

receive a query comprising a document;

generate one or more text sequence labels for the document utilizing the second set of learned model parameters; and provide the one or more text sequence labels in response to the query.

8. The non-transitory computer-readable medium of claim 1, further comprising instructions that, when executed by the at least one processor, cause the computer system to generate the set of ground truth text sequence labels for the text data set by determining beginning, inside, and outside labels for the second text data set.

9. The non-transitory computer-readable medium of claim 1, further comprising instructions that, when executed by the at least one processor, cause the computer system to:

learn the first set of learned model parameters of the first text sequence labeling machine-learning model utilizing a labeled text data set and a labeled set of ground truth text sequence labels corresponding to the labeled text data set; and learn the second set of model parameters of the second text sequence labeling machine-learning model further utilizing the labeled text data set and the labeled set of ground truth text sequence labels.

10. A system comprising:

a memory device comprising a first text data set having a first set of ground truth text sequence labels and a second text data set; and at least one computing device configured to cause the system to:

learn a first set of model parameters of a first text sequence labeling machine-learning model utilizing the first text data set and the first set of ground truth text sequence labels;

initialize a second text sequence labeling machine-learning model utilizing the first set of learned model parameters;

determine a second set of ground truth text sequence labels for the second text data set utilizing the first text sequence labeling machine-learning model, the first set of learned model parameters, and the second text data set;

learn a second set of model parameters of the second text sequence labeling machine-learning model utilizing the first text data set, the first set of ground truth text sequence labels, the second text data set, and the second set of ground truth text sequence labels; and based on identifying an improved validation output from the second text sequence labeling machine-learning model, re-initialize the first text sequence labeling machine-learning model with the second set of learned model parameters.

11. The system of claim 10, wherein the at least one computing device is further configured to cause the system to process one or more text data sets utilizing the second set of learned model parameters of the first text sequence labeling machine-learning model to generate a third set of ground truth text sequence labels for the one or more text data sets.

12. The system of claim 11, wherein the at least one computing device is further configured to cause the system to:

learn a third set of model parameters of the second text sequence labeling machine-learning model utilizing the one or more text data sets and the third set of ground truth text sequence labels;

process a validation data set utilizing the second set of learned model parameters and the third set of learned model parameters; and based on determining that the third set of learned model parameters generate an improved validation output relative to the second set of learned model parameters, re-initialize the first text sequence labeling machine-learning model with the third set of learned model parameters.

13. The system of claim 10, wherein the at least one computing device is further configured to cause the system to learn the second set of model parameters of the second text sequence labeling machine-learning model by:

selecting a first number of text samples from the first text data set;

selecting a second number of text samples from the second text data set, wherein the second number is greater than the first number; and processing the first number of text samples and the second number of text samples to learn the second set of model parameters.

14. The system of claim 10, wherein the at least one computing device is further configured to cause the system to learn a second set of model parameters of the second text sequence labeling machine-learning model by:

generating encoded tokens utilizing a transformer-based encoder from the first text data set;

determining hidden state vectors from the encoded tokens utilizing a bidirectional long short term memory network;

mapping the hidden state vectors to a text sequence label space utilizing a dense layer; and decoding the mapped hidden state vectors into text sequence labels utilizing a linear-chain conditional random field.

15. In a digital medium environment for utilizing machine-learning models to generate text sequence labels from unlabeled documents, a computer-implemented method comprising:

utilizing a first set of learned model parameters of a first text sequence labeling machine-learning model to initialize a second text sequence labeling machine-learning model;

learning a second set of model parameters of the second text sequence labeling machine-learning model utilizing a text data set and a set of ground truth text sequence labels generated utilizing the first set of learned model parameters of the first text sequence labeling machine-learning model;

based on identifying an improved validation output from the second text sequence labeling machine-learning model having the second set of learned model parameters, re-initializing the first text sequence labeling machine-learning model with the second set of learned model parameters; and learning a third set of model parameters of the second text sequence labeling machine learning model utilizing one or more text data sets and an additional set of ground truth text sequence labels generated utilizing the second set of learned model parameters of the first text sequence labeling machine-learning model.

16. The computer-implemented method of claim 15, further comprising identifying the improved validation output from the second text sequence labeling machine-learning model by:
   generating a first validation output by processing a validation data set utilizing the first set of learned model parameters and applying a loss function;
   generating a second validation output by processing the validation data set utilizing the second set of learned model parameters and applying the loss function; and
   comparing the first validation output and the second validation output.

17. The computer-implemented method of claim 15, further comprising:
   receiving a text document;
   generating one or more text sequence labels for the text document utilizing the second set of learned model parameters of the second text sequence labeling machine-learning model; and
   associating the one or more text sequence labels with the text document.

18. The computer-implemented method of claim 15, further comprising learning the second set of model parameters of the second text sequence labeling machine-learning model by:
   generating a predicted set of text sequence labels by processing the text data set utilizing the second text sequence labeling machine-learning model initialized with the first set of learned model parameters;
   determining a loss metric by comparing the set of text sequence labels to the set of ground truth text sequence labels; and
   based on the loss metric, tuning the second text sequence labeling machine-learning model from the first set of learned model parameters to the second set of learned model parameters.

19. The computer-implemented method of claim 15, further comprising:
   learning the first set of learned model parameters of the first text sequence labeling machine-learning model utilizing a labeled text data set having a labeled set of ground truth text sequence labels; and
   learning the second set of model parameters of the second text sequence labeling machine-learning model utilizing a text data set, a set of ground truth text sequence labels, the labeled text data set, and the labeled set of ground truth text sequence labels.

20. The computer-implemented method of claim 19, further comprising:
   learning the third set of model parameters of the second text sequence labeling machine learning model utilizing the one or more text data sets, the additional set of ground truth text sequence labels, the labeled text data set, and the labeled set of ground truth text sequence labels; and
   based on identifying an improved validation output from the second text sequence labeling machine-learning model having the third set of learned model parameters, re-initializing the first text sequence labeling machine-learning model with the third set of learned model parameters.

* * * * *